(12) United States Patent
Shinohara et al.

(10) Patent No.: US 10,184,038 B2
(45) Date of Patent: Jan. 22, 2019

(54) POLYLACTIC ACID-BASED RESIN EXPANDED BEADS AND MOLDED ARTICLE THEREOF

(71) Applicant: JSP CORPORATION, Tokyo (JP)

(72) Inventors: Mitsuru Shinohara, Yokkaichi (JP); Masaharu Oikawa, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 94 days.

(21) Appl. No.: 14/881,800

(22) Filed: Oct. 13, 2015

(65) Prior Publication Data

US 2016/0032070 A1 Feb. 4, 2016

Related U.S. Application Data

(63) Continuation of application No. 14/347,140, filed as application No. PCT/JP2012/071956 on Aug. 30, 2012, now abandoned.

(30) Foreign Application Priority Data

Sep. 28, 2011 (JP) ................. 2011-212209

(51) Int. Cl.
*C08J 9/12* (2006.01)
*C08J 9/18* (2006.01)
(Continued)

(52) U.S. Cl.
CPC ............ *C08J 9/12* (2013.01); *C08G 63/08* (2013.01); *C08J 9/122* (2013.01); *C08J 9/18* (2013.01);
(Continued)

(58) Field of Classification Search
CPC ................... C08J 9/12; C08J 9/16; C08J 9/18
See application file for complete search history.

(56) References Cited

U.S. PATENT DOCUMENTS 2,758,987 A 8/1956 Salzberg
4,057,537 A 11/1977 Sinclair
(Continued)

FOREIGN PATENT DOCUMENTS

EP 0712880 A2 5/1996
EP 1624024 A1 2/2006
(Continued)

OTHER PUBLICATIONS

Machine translation of JP 2011006577 by Furukawa et al. Published Jan. 13, 2011.*

(Continued)

*Primary Examiner* — Michael M Dollinger
*Assistant Examiner* — Christina H Wales
(74) *Attorney, Agent, or Firm* — Bacon & Thomas, PLLC

(57) ABSTRACT

Polylactic acid-based resin expanded beads obtained by releasing a softened, pressurized foamable resin composition, which has a polylactic acid-based resin and a physical blowing agent, to a low pressure atmosphere to foam and expand the resin composition, where the polylactic acid-based resin satisfies the conditions (1) to (3) shown below, and exhibits excellent secondary expansion properties and fusion bonding properties. A polylactic acid-based resin expanded beads molded article obtained by in-mold molding of the polylactic acid-based resin expanded beads exhibits excellent mechanical properties.

$MT \leq 30$ mN  (1)

$\log MT \leq 0.93 \log \eta - 1.75$  (2)

$CT_{1/2} \geq 600$ sec  (3)

(Continued)

where MT represents a melt tension [mN] at 190° C., η represents a melt viscosity [Pa·s] at 190° C. and a shear speed of 20 sec$^{-1}$, and $CT_{1/2}$ represents a half crystallization time [sec] at 110° C.

6 Claims, 8 Drawing Sheets

(51) Int. Cl.
    *C08G 63/08*     (2006.01)
    *C08J 9/232*     (2006.01)

(52) U.S. Cl.
    CPC ........... *C08J 9/232* (2013.01); *C08J 2300/16* (2013.01); *C08J 2333/02* (2013.01); *C08J 2367/04* (2013.01)

(56) References Cited

U.S. PATENT DOCUMENTS

| | | | |
|---|---|---|---|
| 5,310,865 A | | 5/1994 | Enomoto et al. |
| 5,428,126 A | | 6/1995 | Kashima et al. |
| 2006/0167122 A1 | * | 7/2006 | Haraguchi ................ C08J 9/00 521/60 |
| 2012/0009420 A1 | | 1/2012 | Pawloski et al. |
| 2015/0315351 A1 | * | 11/2015 | Shinohara ............. C08J 9/0061 521/59 |

FOREIGN PATENT DOCUMENTS

| | | |
|---|---|---|
| JP | 41-16125 | 9/1966 |
| JP | 43-23858 | 10/1968 |
| JP | 44-29522 | 12/1969 |
| JP | 46-38359 | 11/1971 |
| JP | 51-22951 | 7/1976 |
| JP | 60-185816 A | 9/1985 |
| JP | 04-46217 B2 | 7/1987 |
| JP | 06-22919 B2 | 7/1987 |
| JP | 06-49795 B2 | 11/1987 |
| JP | 09-104026 A | 4/1997 |
| JP | 09-104027 A | 4/1997 |
| JP | 10-180888 A | 7/1998 |
| JP | 2000136261 A | 5/2000 |
| JP | 2003064213 A | 3/2003 |
| JP | 2003321568 A | 11/2003 |
| JP | 2004083890 A | 3/2004 |
| JP | 2006282750 A | 10/2006 |
| JP | 2006282753 A | 10/2006 |
| JP | 2007100025 A | 4/2007 |
| JP | 2009062502 A | 3/2009 |
| JP | 2009068021 A | 4/2009 |
| JP | 2009079202 A | 4/2009 |

OTHER PUBLICATIONS

Machine translation of JP 2009-079202 (Year: 2009).*
International Search Report (ISR) for related application PCT/JP2012/071956, dated Nov. 13, 2012.
Supplemental European Search Report dated May 28, 2015, for EP 12835854.

* cited by examiner

POLYLACTIC ACID-BASED RESIN EXPANDED BEADS AND MOLDED ARTICLE THEREOF

FIELD OF THE INVENTION

The present invention relates to polylactic acid-based resin expanded beads and to a molded article thereof. More specifically, the present invention is directed to polylactic acid-based resin expanded beads having excellent in-mold moldability and capable of producing an in-mold molded article having excellent mechanical properties, and to a molded article thereof.

BACKGROUND ART

In recent years, with an increase of sensitivity to global environment, a polylactic acid-based resin receives attention as a material that is a substitute for general resins produced from the conventional petroleum resources. The polylactic acid-based resin is produced from a plant such as corn as a starting material and is a thermoplastic resin that is regarded as being of a low environmental load type from the standpoint of carbon neutral. Such a polylactic acid-based resin is expected to be used as a plant-derived general resin for foams. Thus studies are being made on foams made of polylactic acid-based resins as a raw material. Among such foams, polylactic acid-based resin expanded beads molded articles can be obtained by in-mold molding in any desired shape without restriction, similar to conventional polystyrene resin expanded beads molded articles. Such molded articles are particularly promising in that they are likely to allow easy design of properties according to the aimed lightness in weight, cushioning property and heat insulating property. In this circumstance, inventions of Patent Documents 1 to 6 have been hitherto made.

Patent Documents 1 to 5 describe that a gas impregnation pre-expansion method was adopted in an attempt to obtain polylactic acid-based expanded beads.

PRIOR ART DOCUMENTS

Patent Document

Patent Document 1: Japanese Kokai Publication No. JP-A-2000-136261
Patent Document 2: Japanese Kokai Publication No. JP-A-2004-83890
Patent Document 3: Japanese Kokai Publication No. JP-A-2006-282750
Patent Document 4: Japanese Kokai Publication No. JP-A-2006-282753
Patent Document 5: Japanese Kokai Publication No. JP-A-2009-62502
Patent Document 6: Japanese Kokai Publication No. JP-A-2007-100025

SUMMARY OF THE INVENTION

An expanded beads molded article disclosed in Patent Document 1 and obtained by expanding gas-impregnated resin particles is found to have significant variation of the density when portions thereof are compared to each other. Further, fusion bonding between expanded beads and the dimensional stability of the article are not sufficient, and mechanical properties thereof are not satisfactory.

Polylactic acid-based resin expanded beads obtained by pre-expanding the gas-impregnated resin particles disclosed in Patent Documents 2 to 4 show an improvement in fusion bonding property between the expanded beads and in secondary expandability during in-mold molding stage. There is, however, a room for further improvement in fusion bonding property in view of the fact that, when a molded article having a complicated shape is intended to be obtained, the fusion bonding between the expanded beads is occasionally not sufficient and that, when the molded article having a large thickness is intended to be obtained, the fusion bonding between the expanded beads in a center region of the molded article is not sufficient.

Expanded beads obtained by the method which is disclosed in Patent Document 5 and which is similar to that of Patent Documents 2 to 4 have good fusion bonding property between the expanded beads and permit the production of molded articles having a large thickness or a complicated shape. However, the expanded beads have a problem in production efficiency because it is necessary to control the degree of crystallinity thereof and, therefore, to severely control the temperature, etc. in order to obtain good fusion bonding property between the expanded beads.

On the other hand, expanded beads obtained by the method of Patent Document 6 in which a foamed extruded body of a polylactic acid-based resin is cut into particles are capable of affording a polylactic acid-based resin expanded beads molded article having excellent heat resistance and mechanical strengths. However, because a polylactic acid-based resin having a relatively high degree of crystallinity is used for the purpose of improving heat resistance, the degree of crystallinity of the polylactic acid resin from which the expanded beads are formed is liable to become high. Therefore, the expanded beads have a problem in stable production of molded articles having good fusion bonding property.

With a view toward solving the problems of the prior art such as poor fusion bonding between expanded beads, insufficient dimensional stability and insufficient mechanical properties, the present inventors have tried a dispersing medium release foaming method. Namely, the present inventors have tried a method in which polylactic acid-based resin particles are dispersed in a dispersing medium in a pressure resisting vessel in the presence of a physical blowing agent with heating under a pressure to obtain foamable polylactic acid-based resin particles, the foamable resin particles being subsequently released together with the dispersing medium to an atmosphere which is maintained at a pressure lower than that in the pressure resisting vessel so that the resin particles are foamed and expanded. It has been found that the above method can produce polylactic acid-based resin expanded beads showing good secondary expansion property and fusion bonding property at the time of in-mold molding and having good heat resistance and relatively high expansion ratio without need to severely control the degree of crystallinity of the polylactic acid-based resin expanded beads. However, although in-mold molding of the obtained expanded beads gives an expanded beads molded article having good appearance, the expanded beads are apt to shrink so that there arises new problems that physical properties inherent to the polylactic acid resin are not sufficiently maintained and the mechanical properties of the expanded beads molded article are not sufficiently developed.

Shrunken expanded beads require troublesome control of expansion ratio. Additionally, although shrunken expanded beads, when molded in a mold cavity, can further expand in the mold cavity and can give a molded article, the physical property improving effect attributed to the orientation of the polymer as a consequence of expansion and stretching is not considered to be fully achieved and, hence, it is difficult to sufficiently develop the physical properties of the polylactic acid resin.

In view of the above-described new problems, the present invention is aimed at the provision of expanded beads that excel in secondary expansion efficiency and fusion-bonding property at the time of in-mold molding and that can produce a polylactic acid-based resin expanded beads molded article having excellent mechanical properties.

Means for Solving the Problems

In accordance with the present invention there are provided the following polylactic acid-based resin expanded beads:

[1] Polylactic acid-based resin expanded beads obtained by releasing a softened, pressurized foamable resin composition, which comprises a polylactic acid-based resin and a physical blowing agent, to a low pressure atmosphere to foam and expand the resin composition, wherein the polylactic acid-based resin satisfies the following conditions (1) to (3):

$$MT \leq 30 \text{ mN} \tag{1}$$

$$\log MT \leq 0.93 \log \eta - 1.75 \tag{2}$$

$$CT_{1/2} \leq 600 \text{ sec} \tag{3}$$

where MT represents a melt tension [mN] of the polylactic acid-based resin at 190° C., η represents a melt viscosity [Pa·s] of the polylactic acid-based resin at 190° C. and a shear speed of 20 sec$^{-1}$, and $CT_{1/2}$ represents a half crystallization time [sec] of the polylactic acid-based resin at 110° C.;

[2] The polylactic acid-based resin expanded beads as recited in above [1],
wherein the polylactic acid-based expanded resin beads, when measured by the below-mentioned heat flux differential scanning calorimetry, give a first time DSC curve and a second time DSC curve,
wherein the second time DSC curve has a fusion peak having a reference peak top temperature,
wherein the first time DSC curve has both a fusion peak(s) with a peak top temperature that is on a high temperature side which is higher than the reference peak top temperature and a fusion peak(s) with a peak top temperature that is on a low temperature side which is not higher than the reference peak top temperature, and
wherein the first and second time DSC curves are measured and defined as follows:
(a) a DSC curve of a test sample of the expanded polylactic acid-based resin beads is measured according to a heat flux differential scanning calorimetry method referenced in JIS K7122 (1987), by heating the test sample at a heating rate of 10° C./minute from 23° C. to a temperature higher by 30° C. than the temperature at which the endothermic peak ends, thereby obtaining the first time DSC curve;
(b) the test sample is then maintained for 10 minutes at the temperature higher by 30° C. than the temperature at which the endothermic peak ends in the first time DSC curve;
(c) the test sample is then cooled to 30° C. at a cooling rate of 10° C./minute;
(d) the test sample is then measured again for another DSC curve by being heated at a heating rate of 10° C./minute to a temperature higher by 30° C. than the temperature at which the endothermic peak ends, thereby obtaining the second time DSC curve;

[3] The polylactic acid-based resin expanded beads as recited in above [2], wherein the fusion peak(s) with the peak top temperature that is on a higher temperature side which is higher than the reference peak top temperature has a calorific value of 1 to 8 J/g;

[4] The polylactic acid-based resin expanded beads as recited in above [1], wherein the polylactic acid-based resin expanded beads have an apparent density of 24 to 240 g/L;

[5] A polylactic acid-based resin expanded beads molded article obtainable by molding the polylactic acid-based resin expanded beads according to any one of above [1] to [4] in a mold cavity, said molded article having a density of 15 to 150 g/L and satisfying the following formula (4):

(Bending modulus (MPa) of the expanded beads
molded article)/(Density (g/L) of the expanded
beads molded article)≥0.20 (MPa·L/g) (4)

The expanded beads of the present invention are those obtained by releasing a softened expandable resin composition, which comprises a specific polylactic acid-based resin impregnated with a physical blowing agent, from a high pressure condition to a low pressure atmosphere (generally an atmosphere of ambient temperature and atmospheric pressure) to foam and expand the resin composition. The obtained expanded beads after expansion are prevented from shrinking and are small in variation of apparent density (expansion ratio) thereof. Further, the expanded beads of the present invention show excellent secondary expansion efficiency and fusion bonding property during in-molding molding stage and, hence, can give an expanded beads molded article having excellent mechanical properties. Thus, the polylactic acid-based resin expanded beads molded article obtained by in-mold molding of the expanded beads of the present invention have excellent mechanical properties.

DETAILED DESCRIPTION OF THE INVENTION

Figure 1:
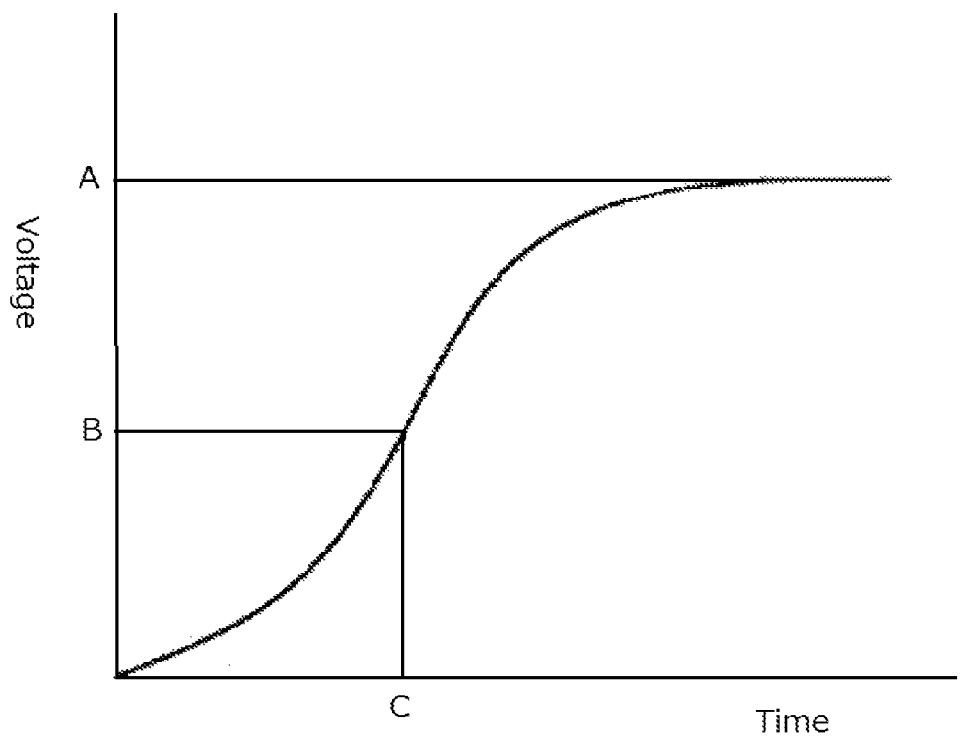
FIG. 1 is a graph for explaining a method of measuring a half crystallization time.

The polylactic acid-based resin expanded beads of the present invention will be described in detail below. The polylactic acid-based resin expanded beads (hereinafter occasionally simply referred to as "expanded beads") of the present invention are obtained by releasing a softened, pressurized expandable resin composition, which contains a polylactic acid-based resin having specific physical properties as described hereinafter and a physical blowing agent, to a low pressure atmosphere to foam and expand the resin composition. When the expandable resin composition is in the form of particles of the polylactic acid-based resin, for example, the release of the expandable resin composition may be carried out by discharging the expandable polylactic acid-based resin particles, which are dispersed in a dispersing medium in a pressure resisting vessel and maintained in high temperature and high pressure conditions, preferably a temperature of about 120 to 160° C. and a pressure of about 1.0 to 5.0 MPa (G (gauge)), to an atmosphere having a lower temperature and a lower pressure than those within the vessel, preferably a temperature of about 0 to 50° C. and a pressure of about 0 to 0.3 MPa (G), together with the dispersing medium. As an expansion method which can satisfy the condition of the present invention for releasing a softened, pressurized expandable resin composition to a low pressure atmosphere to foam and expand the resin composition, there may be mentioned the above-described dispersing medium release foaming method and, else, an extrusion foaming method. On the other hand, a known method in which foamable resin particles impregnated with a blowing agent are heated and expanded with a heating and foaming apparatus cannot satisfy the expansion and foaming conditions of the present invention. In the present specification, the following description will be made mainly on the dispersing medium release foaming method which is advantageous in control of the stretch of the resin during the foaming step and in obtaining of expanded beads with a small apparent density.

The expanded beads of the present invention are formed of a polylactic acid-based resin (hereinafter occasionally referred to simply as "PLA resin"). The PLA resin may be polylactic acid or a mixture of polylactic acid with other resin or resins. The polylactic acid is preferably a polymer containing at least 50 mol % of component units derived from lactic acid. Examples of the polylactic acid include (a) a polymer of lactic acid, (b) a copolymer of lactic acid with other aliphatic hydroxycarboxylic acid or acids, (c) a copolymer of lactic acid with an aliphatic polyhydric alcohol and an aliphatic polycarboxylic acid, (d) a copolymer of lactic acid with an aliphatic polycarboxylic acid, (e) a copolymer of lactic acid with an aliphatic polyhydric alcohol, and (f) a mixture of two or more of (a)-(e) above. Examples of the polylactic acid also include so-called stereocomplex polylactic acid and stereoblock polylactic acid. Specific examples of the lactic acid include L-lactic acid, D-lactic acid, DL-lactic acid, a cyclic dimer thereof (i.e. L-lactide, D-lactide or DL-lactide) and mixtures thereof.

In the present invention, preferably used is polylactic acid which satisfies conditions (1) to (3) described hereinafter and which has a ratio of lactic acid isomers (D-isomer/L-isomer) of 99:1 to 94:6 or 6:94 to 1:99, particularly preferably 97:3 to 94:6 or 6:94 to 3:97.

Examples of other aliphatic hydroxycarboxylic acid in (b) above include glycolic acid, hydroxybutyric acid, hydroxyvaleric acid, hydroxycaproic acid and hydroxyheptoic acid. Examples of the aliphatic polyhydric alcohol in (c) and (e) above include ethylene glycol, 1,4-butanediol, 1,6-hexanediol, 1,4-cyclohexanedimethanol, neopentyl glycol, decamethylene glycol, glycerin, trimethylolpropane and pentaerythritol. Examples of the aliphatic polycarboxylic acid in (c) and (d) above include succinic acid, adipic acid, suberic acid, sebacic acid, dodecanedicarboxylic acid, succinic anhydride, adipic anhydride, trimesic acid, propanetricarboxylic acid, pyromellitic acid and pyromellitic anhydride.

As specific examples of the method for preparing polylactic acid used in the present invention, there may be mentioned a method in which lactic acid or a mixture of lactic acid and aliphatic hydroxycarboxylic acid is subjected to a direct dehydration polycondensation (preparation method disclosed, for example, in U.S. Pat. No. 5,310,865); a method in which a cyclic dimer of lactic acid (namely lactide) is subjected to ring-open polymerization (preparation method disclosed, for example, in U.S. Pat. No. 2,758,987); a method in which cyclic dimers of lactic acid and an aliphatic hydroxycarboxylic acid, such as lactide and glycolide, and ε-caprolactone are subjected to ring-open polymerization in the presence of a catalyst (preparation method disclosed, for example, in U.S. Pat. No. 4,057,537); a method in which a mixture of lactic acid, an aliphatic dihydric alcohol and an aliphatic dibasic acid is subjected to direct dehydration polycondensation (preparation method disclosed, for example, in U.S. Pat. No. 5,428,126); a method in which lactic acid, an aliphatic dihydric alcohol and an aliphatic dibasic acid are subjected to polycondensation in an organic solvent (preparation method disclosed, for example, in EP-A-0712880A2); and a method in which a lactic acid polymer is subjected to dehydration polycondensation in the presence of a catalyst to produce a polyester and in which at least one step of polymerization in a solid phase is involved during the course of the polycondensation. The method for producing polylactic acid is not limited to the above methods.

The PLA resin used in the present invention should satisfy the following conditions (1) to (3):

$$MT \leq 30 \text{ mN} \quad (1)$$

$$\log MT \leq 0.93 \log \eta - 1.75 \quad (2)$$

$$CT_{1/2} \leq 600 \text{ sec} \quad (3)$$

(wherein MT represents a melt tension [mN] at 190° C., $\eta$ represents a melt viscosity [Pa·s] at 190° C. and a shear speed of 20 sec$^{-1}$, and $CT_{1/2}$ represents a half crystallization time [sec] at 110° C.).

It is believed that because the melt tension, the melt viscosity relative to the melt tension, and the half crystallization time of the PLA resin fall within the specific ranges defined by formulas (1) to (3), when the expandable resin composition is released to a low pressure atmosphere to foam and expand same, the resin that forms cell walls is stretched to cause molecular orientation, so that the strength of the cell walls is improved and shrinkage thereof after expansion is prevented. Among the conditions (1) to (3), the conditions (1) and (2) indicate that the PLA resin contains only a few branched chains or no branched chains, while the condition (3) indicates that the PLA resin in a softened state has a crystallization speed which is suited for molecular orientation of the softened resin at the time of foaming.

Hitherto, it has been the commonly accepted that a resin which has a structure with a large number of branched chains and which is high in melt tension is suited for foaming. Contrary to the common sense, the present inventors have found that, a specific PLA resin which contains only a few branched chains or no branched chains and which is relatively slow in crystallization speed can facilitate stretching of the resin that forms cell walls during the expanding and foaming step by the aforementioned release to a low pressure atmosphere and can give expanded beads having excellent mechanical strengths.

The PLA resin which meets the above conditions (1) and (2) exhibits such a viscoelastic behavior that is suited for foaming at the time of the aforementioned release to a low pressure atmosphere and can be stretched without receiving an excessive stress and without causing breakage of cell walls. From this point of view, it is preferred that the condition (1) is such that the melt tension is 25 mN or less. Here, the lower limit of the melt tension is generally 10 mN, preferably 12 mN. For the same reason as above, it is preferred that the condition (2) is such as to satisfy the following condition (5), particularly preferably the following condition (6).

$$\log MT \leq 0.93 \log \eta - 1.80 \quad (5)$$

$$\log MT \leq 0.93 \log \eta - 1.85 \quad (6)$$

(wherein MT represents a melt tension [mN] at 190° C., $\eta$ represents a melt viscosity [Pa·s] at 190° C. and a shear speed of 20 sec$^{-1}$.)

Stretching of the PLA resin that meets the above condition (3) as well as the above conditions (1) and (2) stops when the cell walls in a softened state solidify. Thus, the PLA resin can be sufficiently stretched and can sufficiently undergo molecular orientation until growth of the cells has been completed. As a consequence, the obtained expanded beads are prevented from shrinking so that an expanded beads molded article obtained by molding the expanded beads in a mold cavity (hereinafter occasionally referred to simply as "molded article") has improved compressive strength and bending modulus as compared with those of the conventional articles. From this point of view, the half crystallization time is preferably 700 sec or more, more preferably 800 sec or more. The upper limit of the half crystallization time is generally 4,000 sec, preferably 3,500 sec.

The expanded beads obtained from the PLA resin that satisfies the above conditions (1) to (3) exhibit excellent secondary expansion efficiency and fusion bonding property at the time of in-mold molding. This is because the expanded beads obtained from the PLA resin that satisfies the above conditions (1) and (2) have cell walls that have been stretched without having been applied with an excessive stress during stretching of the resin and because it is therefore easy to achieve a high closed cell content of the bead. Further, because the PLA resin satisfies the above condition (3), it is easy to obtain expanded beads having an appropriately low degree of crystallinity by expanding and foaming expandable PLA resin in a softened state.

Accordingly, it is believed that because the obtained expanded beads have an appropriately low degree of crystallinity and a high closed cell content, the secondary expansion efficiency and fusion bonding property of the expanded beads at the time of in-mold molding are excellent.

The PLA resin that satisfies the above conditions (1) to (3) may be obtained by selecting a resin which satisfies the above condition (3) from among those polylactic acids which have only a few branched chains or no branched chains and which satisfy the above conditions (1) and (2). The hereinafter described measurement may be done for the purpose of the above selection. The PLA resins which satisfy the above conditions (1) and (2) may be obtained by mixing a plurality of polylactic acids or by adding a so-called thickening agent as appropriate for adjusting the melt tension and melt viscosity thereof. A substance such as polytetrafluoroethylene which serves to function as a crystal nucleus agent and to accelerate the crystallization speed or a substance which serves to inhibit crystallization and to retard the crystallization speed may be also added to polylactic acid as appropriate to formulate a PLA resin that satisfies the condition (3). Thus, the PLA resin that satisfies the above conditions (1) to (3) may be one which is selected from commercially available polylactic acids, one which is obtained by mixing a plural kinds of polylactic acids, one which is obtained by mixing polylactic acid(s) with other resin or resins, or one which is obtained by adding an additive such as a thickening agent to polylactic acid(s). The measurement of each of the melt viscosity, melt tension and half crystallization time of the PLA resin is basically carried out on the resin particles to be placed in a pressure resisting vessel when a dispersing medium release foaming method is adopted and on the resin to be fed to an extruder when an extrusion foaming method is adopted. However, when the polylactic acid resin is to be modified with a thickening agent or the like in the pressure resisting vessel or in the extruder, the measurement of each of the melt viscosity, melt tension and half crystallization time of the PLA resin is carried out after the resin has been modified and sampled from the vessel or the extruder.

The melt viscosity as used herein may be measured using a measuring device such as Capirograph 1D (manufactured by Toyo Seiki Selsaku-Sho, Ltd.). Concretely, use is made of a cylinder having a cylinder diameter of 9.55 mm and a length of 350 mm and an orifice having a nozzle diameter of 1.0 mm and a length of 10 mm. The cylinder and the orifice are set at a temperature of 190° C. A required amount of a specimen which has been fully dried at 80° C. is charged into the cylinder and held for 4 minutes. The resulting molten specimen is then extruded in the form of a string through the orifice at a shear speed of 20 sec$^{-1}$ to measure the melt viscosity under the described conditions.

The melt tension as used herein may be measured by a speed-increasing winding method using Capirograph 1D (manufactured by Toyo Seiki Selsaku-Sho, Ltd.). Concretely, use is made of a cylinder having a cylinder diameter of 9.55 mm and a length of 350 mm and an orifice having a nozzle diameter of 2.095 mm and a length of 8 mm. The cylinder and the orifice are set at a temperature of 190° C. A required amount of a specimen which has been fully dried at 80° C. is charged into the cylinder and held for 4 minutes. The resulting molten specimen is then extruded in the form of a string through the orifice at a piston speed of 10 mm/minute. The extruded string is put on a tension-detecting pulley having a diameter of 45 mm and is taken up on a take-up roller while increasing the take-up speed at a constant take-up acceleration rate such that the take-up speed increases from 0 m/minute to 200 m/min through a period of 10 minutes to detect the melt tension at the breakage of the string by the Capirograph device. When the string is not broken even when the take-up speed reaches 200 m/min, the melt tension detected by the device at the take-up speed of 200 m/min is adopted. The above measurement is carried out for ten different specimens. From the obtained ten measured maximum values, the largest three values and the smallest three values are excluded. The arithmetic mean of the rest four maximum values is the melt tension (mN) for the purpose of the present invention.

The "half crystallization time" as used herein may be measured using a crystallization speed analyzer (Model MK-801 manufactured by METRON Inc, (formerly Kotaki Shoji Co., Ltd.)). A resin sample which has been heated at 200° C. for 3 minutes in an air bath is placed in a crystallization bath (oil bath) maintained at 110° C. and measured for the half crystallization time. The resin sample for the measurement is in the form of a PLA resin film. The film has a thickness of 0.1±0.02 mm and is a square with a 15 mm×15 mm size. The sample is sandwiched between cover glasses for a microscope. An indicated voltage of 3 V is selected for setting the brightness of the lamp for a light source.

The crystallization speed analyzer manufactured by METRON Inc. utilizes a relationship between crystallization and birefringence of the sample. The half-crystallization time as used herein is determined as follows. Namely, the above measurement will give a curve on a graph as illustrated in FIG. 1. From the curve, a value A on the ordinate at which the quantity of the light attributed to the birefringence becomes constant is determined. Next, a value B is calculated by multiplying A by 0.5. The half-crystallization time is a value C on the abscissa (axis representing time) at which the curve assumes the value B.

The PLA resin used in the present invention is preferably capped at its molecular chain ends. By this, it is possible to surely suppress hydrolysis during the course of the preparation of expanded beads, so that the dispersing medium release foaming method (hereinafter described) can be much easily carried out. Namely, it becomes easy to reliably form and control the high temperature peak. Thus, it becomes easy to produce expanded beads that are capable of withstanding in-mold molding. Additionally, a molded article obtained by in-mold molding has improved durability. In the case of an extrusion molding method, too, it is possible to suppress hydrolysis which is not wanted.

Examples of the end capping agent include carbodiimide compounds, oxazoline compounds, isocyanate compounds and epoxy compounds. Above all, carbodiimide compounds are preferred. Specific examples of the diimide compounds include an aromatic monocarbodiimide such as bis(dipropylphenyl)carbodiimide, an aliphatic polycarbodiimide such as poly(4,4'-dicyclohexylmethanecarbodiimide, and an aromatic polycarbodiimide.

These end capping agents may be used alone or in combination of two or more thereof. The using amount of the end capping agent is preferably 0.1 to 5 parts by weight, more preferably 0.5 to 3 parts by weight, per 100 parts by weight of the PLA resin.

The PLA resin which forms the expanded beads of the present invention may contain other resins as long as the objects and effects of the present invention are not adversely affected.

Examples of additives that may be compounded in the PLA resin which forms the expanded beads of the present invention include a coloring agent, a flame retardant, an antistatic agent, a weatherability agent and an electric conductivity imparting agent.

When the base resin is mixed with additives, the additives may be kneaded as such together with the base resin. In view of dispersing efficiency of the additives into the base resin, however, the additives are generally formed into a master batch which is then kneaded with the base resin. The additives are preferably added in an amount of 0.001 to 20 parts by weight, more preferably 0.01 to 5 parts by weight, per 100 pars by weight of the base resin, though the amount varies with the kind of the additives.

It is preferred that the expanded beads of the present invention, when subjected to heat flux differential scanning calorimetry, give such a first time DSC curve and a second time DSC curve as follows. In the first time DSC curve, there appear a fusion peak(s) (hereinafter occasionally referred to as "high temperature peak") having a peak top temperature which is higher than a reference peak top temperature, and another fusion peak(s) (hereinafter occasionally referred to as "intrinsic peak") having a peak top temperature which is not higher than the reference peak top temperature, wherein the reference peak top temperature is a peak top temperature of a fusion peak of the second time DSC curve. When, in the second time DSC curve (I), there are a plurality of fusion peaks or when there is a shoulder on high temperature side of a fusion peak, then the peak top temperature of a fusion peak of the second time DSC curve (I) is the peak top temperature of the fusion peak or the flection point temperature of the shoulder that is the highest among the peak top temperatures of the fusion peaks and the flection point temperatures of the shoulders.

The first and second time DSC curves are measured and defined as follows:

(a) a DSC curve of a test sample of the expanded beads is measured according to a heat flux differential scanning calorimetry method referenced in JIS K7122 (1987), by heating the test sample at a heating rate of 10° C./minute from 23° C. to a temperature higher by 30° C. than the temperature at which the endothermic peak ends, thereby obtaining the first time DSC curve (I);

(b) the test sample is then maintained for 10 minutes at the temperature higher by 30° C. than the temperature at which the endothermic peak ends in the first time DSC curve;

(c) the test sample is then cooled to 30° C. at a cooling rate of 10° C./minute;

(d) the test sample is then measured again for another DSC curve by being heated at a heating rate of 10° C./minute to a temperature higher by 30° C. than the temperature at which the endothermic peak ends, thereby obtaining the second time DSC curve (I).

It is believed that the expanded beads, which show the high temperature peak, have improved heat resistance and solidity at high temperatures and are prevented from excessively secondarily expanding during in-mold molding of the expanded beads, so that a heating medium can sufficiently heat the expanded beads located all parts in the mold cavity. As a result, the fusion bonding of the expanded beads during the in-mold molding is improved. It follows that the obtained molded article shows excellent fusion bonding even when the thickness thereof is large or the shape thereof is complicated.

The above-described high temperature peak appears in a first time DSC curve (I) obtained in the measurement of the expanded beads by differential scanning calorimetry, but does not appear in a second time DSC curve (I). The high temperature peak that appears in the first time DSC curve (I) of the expanded beads is attributed to crystal growth of the polylactic acid resin during a heat treatment which will be described hereinafter. The intrinsic peak that appears in the second time DSC curve (I) of the expanded beads is a fusion peak which is attributed to the intrinsic crystal structure of the PLA resin.

The phenomenon of appearance of such a high temperature peak in the first time DSC curve (I) of the expanded beads is considered to be ascribed to secondary crystals formed through the thermal history in a process for expanding resin particles to obtain the expanded beads.

Figure 2:
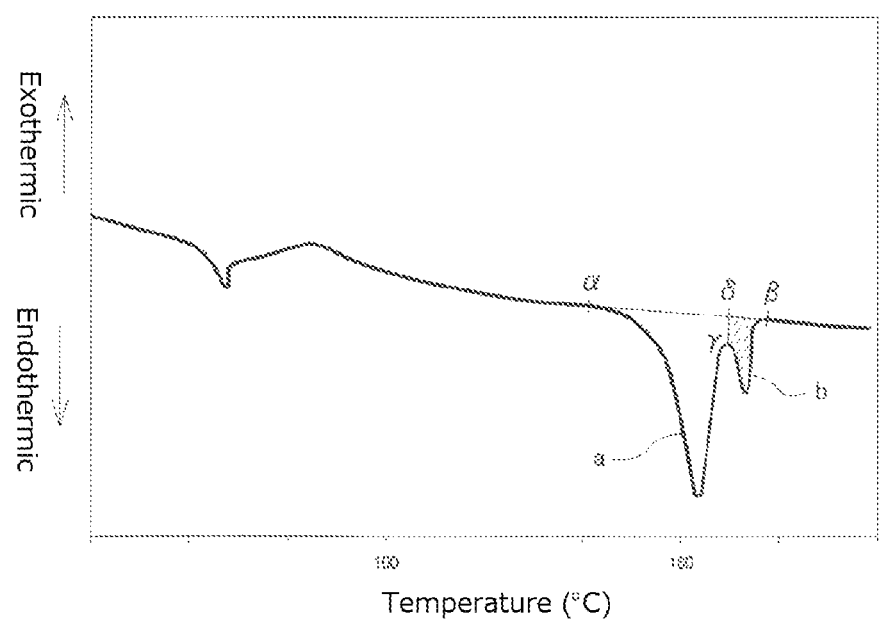
FIG. 2 illustrates an example of a first time DSC curve (I)
Figure 3:
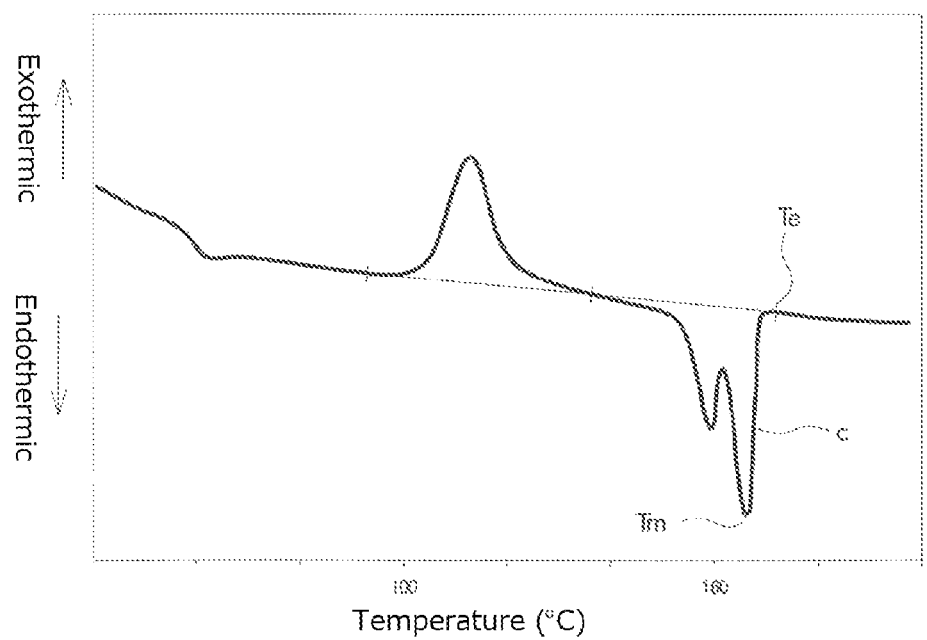
FIG. 3 illustrates an example of a second time DSC curve (I)

FIG. 2 illustrates an example of the first time DSC curve (I) and FIG. 3 illustrates an example of the second time DSC curve (I). From a comparison of FIG. 2 and FIG. 3, it will be seen that, when the peak top temperature of the higher temperature-side fusion peak among the two fusion peaks in FIG. 3 is regarded as being a reference peak top temperature, the high temperature peak is a fusion peak in FIG. 2 which has a peak top temperature higher than the reference peak top temperature, while the intrinsic peak is a fusion peak which has a peak top temperature not higher than the reference peak top temperature. That is, in FIG. 2, the intrinsic peak is a fusion peak "a" while the high temperature peak is a fusion peak "b".

In the present specification, a peak top temperature of a fusion peak that has the largest area in the second time DSC curve (I), i.e. the peak top temperature of the fusion peak "c" is defined as a melting point Tm of the PLA resin, and the temperature at which the skirt on a high temperature-side of the fusion peak returns to base line is defined as a fusion peak ending temperature Te.

Incidentally, although the two fusion peaks "a" and "b" in FIG. 2 are each shown as a smooth curve, DSC curves are not always smooth. There are cases where a plurality of overwrapped fusion peaks appear in DSC curves so that a plurality of intrinsic peaks and a plurality of high temperature peaks are present in the DSC curves.

The calorific value (J/g) of the high temperature peak is determined from the first time DSC curve (I) shown in FIG. 2 as follows. A straight line connecting a point α which is a point where an endothermic peak begins separating from a low temperature-side base line and a point β which is a point where the endothermic peak returns to a high temperature-side base line is drawn. Next, a line which is in parallel with the ordinate and which passes a point γ on the DSC curve at the bottom of the valley between the intrinsic peak "a" and the high temperature peak "b" is drawn. This line crosses the line connecting the points α and β at a point δ. The calorific value of the high temperature peak is an amount of endotherm corresponding to the area (shaded portion in FIG. 2) defined by the line connecting the points γ and δ, the line connecting the points δ and β, and the DSC curve. Incidentally, there is a case where an exothermic peak contiguous with the fusion peak "a" appears in the low-temperature side of the fusion peak "a" (this is not the case in FIG. 2), so that it is difficult to determine the point α as a point at which the fusion peak begins separating from the low temperature-side base line in the above-described manner. In such a case, the point α is determined as a point at which the exothermic peak begins separating from the low temperature-side base line.

The endothermic calorific value of the high temperature peak (when the high temperature peak is constituted of a plurality of fusion peaks, a total endothermic calorific value of the fusion peaks) is preferably 1 to 8 J/g. When the expanded beads, whose high temperature peak has an excessively small endothermic calorific value, are heated by introducing steam into the mold cavity at the time of in-mold molding, those portions of the expanded beads located near the surface of the mold primarily undergo secondary expansion beyond necessary. As a result, the heating medium such as steam is prevented from sufficiently flowing into all parts of the mold cavity filled with the expanded beads. Accordingly, there is a possibility that it becomes difficult to obtain a molded article having good fusion bonding in a center part thereof. When the high temperature peak has an excessively large endothermic calorific value, on the other hand, the expanded beads cannot sufficiently secondarily expand in an in-mold molding stage. As a result, there is a possibility that it becomes difficult to obtain a molded article having good fusion bonding between the expanded beads and good appearance. For these reasons, the calorific value of the high temperature peak is more preferably 2 to 8 J/g. The upper limit of the calorific value of the high temperature peak is generally 25 J/g.

It is preferred that the expanded beads of the present invention each have a multi-layer structure (hereinafter occasionally referred to as multi-layer expanded beads) which includes a core layer formed of a PLA resin, and an outer layer covering the core layer and formed of another PLA resin. In this case, at least the core layer of the multi-layer expanded beads should be formed of the PLA resin that meets the above-described conditions (1) to (3). It is not necessary that the outer layer should entirely cover the core layer. The resin of which the core layer of the multi-layer expanded beads is formed may be exposed on a part of the surface of the multi-layer expanded beads.

It is preferred that the softening point (B) [° C.] of the PLA resin of which the outer layer is formed is lower than the softening point (A) [° C.] of the PLA resin of which the core layer is formed and that a difference [(A)−(B)] between the softening point (A) and the softening point (B) be greater than 0° C. and is not greater than 105° C., more preferably from 15 to 105° C., still more preferably from 20 to 105° C. The multi-layer expanded beads that show the above specific range of the difference in softening point may be produced by a method as described hereinafter which includes coextruding PLA resins with softening points (B) and (A) of the outer and core layers, and expanding the obtained multi-layered resin particles. When the multi-layer expanded beads meet the hereinafter described formulas (7) and (8), especially additionally the formula (9) show excellent fusion bonding property in a further stable manner during an in-mold molding stage. It is preferred, from the standpoint of handling efficiency of the multi-layer expanded beads and mechanical strengths at elevated temperatures of molded articles obtained therefrom, that the softening point of the PLA resin of the outer layer not only meets the above-mentioned relationship with the softening point of the PLA resin of the core layer but also is 50° C. or more, more preferably 55° C. or more, particularly preferably 65° C. or more.

As used herein, the term "softening point" is intended to refer to a Vicat softening point as measured according to JIS K7206 (1999), Method A50. In particular, a PLA resin is sufficiently dried in a vacuum oven and pressed at 200° C. and 20 MPa (if necessary, air evacuation is carried out so as to prevent inclusion of air bubbles) to obtain a test piece with a length of 20 mm, a width of 20 mm and a thickness of 4 mm. The test piece is annealed in an oven at 80° C. for 24 hours and then measured using, for example, HDT/VSPT tester Model TM-4123 manufactured by Ueshima Seisakusho Co., Ltd.

In the multi-layer expanded beads of the present invention each having the core layer and outer layer, it is preferred that the weight ratio of the resin of which the core layer is formed to the resin of which the outer layer is formed is 99.9:0.1 to 75:25, more preferably 99.7:0.3 to 85:15, still more preferably 99.5:0.5 to 90:10. When the weight proportion of the resin of the outer layer of the multi-layer expanded beads is excessively small, the thickness of the outer layer of the multi-layer expanded beads is so thin that the effect of improving the fusion bonding efficiency of the multi-layer expanded beads in an in-mold molding stage decreases. Additionally, there may cause a problem in production efficiency in the production of the multi-layer expanded beads. When the weight proportion of the outer layer is excessively great, the resin forming the outer layer tends to unnecessarily expand to cause a reduction of the effect of improving the fusion bonding efficiency of the multi-layer expanded beads in an in-mold molding stage. Additionally, there is a possibility that the mechanical properties of the molded article is deteriorated. In the multi-layer expanded beads, the resin forming the outer layer may be expanded as long as the objects and effects of the present invention are not adversely affected.

In the multi-layer expanded beads, the weight ratio of the resin of which the core layer is formed to the resin of which the outer layer is formed may be controlled by controlling the weight ratio of the resin of which a core layer of resin particles (described hereinafter) is formed to the resin of which the outer layer of the resin particles is formed.

The above-described end capping agent, when added to the PLA resin forming the multi-layer expanded beads, is preferably incorporated at least in the core layer, more preferably in each of the core and outer layers. When at least the PLA resin of the core layer, preferably the PLA resin of each of the core and outer layers, is modified with the end capping agent, it is possible to further suppress hydrolysis thereof during the course of the preparation of expanded beads, so that expanded beads can be produced in a stable manner. Further, it is also possible to suppress hydrolysis during the course of the preparation of molded articles so that the production efficiency of the molded articles can be produced in a stable manner. Moreover, when the molded articles are subjected to actual use, they are expected to show improved durability and withstand use under a high temperature and high humidity environment.

In the multi-layer expanded beads, the thickness of the outer layer is desired to be thin, because cells are hard to be formed in the outer layer and because mechanical strengths of the expanded beads molded article are improved. When the thickness of the outer layer is excessively low, there may be apprehension that the effect of improving fusion bonding between the multi-layer expanded beads is adversely affected. In actual, however, sufficient fusion bonding improving effect is achieved when the thickness is in the range described below. Namely, the outer layer of the multi-layer expanded beads preferably has an average thickness of 0.1 to 25 µm, more preferably 0.2 to 15 µm, particularly preferably 0.3 to 10 µm. The average thickness of the outer layer of the multi-layer expanded beads may be controlled by a control of the weight ratio of a resin of a core layer to a resin of an outer layer of the multi-layered resin particles during the fabrication thereof. The average thickness of the outer layer of the multi-layered resin particles should be controlled as appropriate in view of the weight of the resin particles and desired expansion ratio, but preferably has an average thickness of 2 to 100 µm, more preferably 3 to 70 µm, particularly preferably 5 to 50 µm.

The average thickness of the outer layer of the multi-layer expanded beads is measured as follows. One multi-layer expanded bead is cut into nearly equal halves. From a photograph of the enlarged cross section of the bead, the thickness of the outer layer in each of the four positions (upper and lower sides, and left and right sides) thereof is measured. The arithmetic mean of the four thickness values is the thickness of the outer layer of the expanded bead. Similar procedures are repeated for a total of 10 expanded beads. The arithmetic mean of the ten thickness values is the average thickness of the outer layer of the expanded beads. The average thickness of the outer layer of the multi-layered resin particles is also measured in a similar manner. In the multi-layer expanded beads and multi-layered resin particles, when the outer layer is formed on parts of the peripheral surface of the core layer, there may arise a case where the thickness of the outer layer cannot be measured in any way at the above four positions. In such a case, the thickness of the outer layer is measured at four randomly selected measurable positions and the arithmetic mean thereof is defined as the thickness of the outer layer of the multi-layer expanded beads or resin particles. Also, when the outer layer of the expanded beads is not easily discriminated, it is preferable to produce the multi-layer expanded beads in such a manner that a suitable colorant is incorporated in the resin of which the outer layer is formed.

The expanded beads according to the present invention, irrespective of whether they are multi-layer expanded beads or not, it is preferred that the expanded bead as a whole shows a specific endothermic calorific value (Br:endo). In the case of the multi-layer expanded beads, it is preferred that the expanded bead additionally shows a specific relationship between the endothermic calorific value (Brs:endo) of a surface region of the expanded bead and the endothermic calorific value (Brc:endo) of a center region of the expanded bead.

More specifically, in the expanded beads of the present invention, it is preferred that an endothermic calorific value (Br:endo) [J/g] of the whole expanded bead after a heat treatment, which is determined in accordance with heat flux differential scanning calorimetry under the Condition 2 described below, meets the following formula (7):

$$25 < (Br:endo) \leq 40 \tag{7}$$

In the above formula (7), the fact that (Br:endo) is within the above range means that, when the expanded bead is heat treated under such conditions that crystallization of the polylactic acid which constitutes the expanded bead sufficiently proceeds, the amount of the polylactic acid crystal components of the polylactic acid in the expanded bead is not excessively large and is not excessively small. Namely, it is meant that when the heat treatment is carried out sufficiently to increase the degree of crystallinity of the polylactic acid which constitutes the expanded bead, an expanded beads-molded article having an appropriately increased degree of crystallinity can be obtained. Therefore, there is no fear of excessive reduction of the mechanical strengths and heat resistance such as compressive strength at a high temperature of the expanded beads-molded article. From this point of view, (Br:endo) is preferably 30 to 40 J/g.

In the expanded beads of the present invention, it is further preferred that the endothermic calorific value (Brs:endo) [J/g] of a surface region of the expanded bead after a heat treatment and the endothermic calorific value (Brc:endo) [J/g] of a center region of the expanded bead after the heat treatment satisfy a relationship represented by the following formula (8):

$$(Brc:endo) > (Brs:endo) \geq 0 \tag{8}$$

The fact that the above formula (8) is met means that when the expanded bead is heat treated under such conditions that crystallization of the polylactic acid which constitutes the surface region and center region of the expanded bead sufficiently proceeds, the amount of the polylactic acid crystal components that constitute the surface region of the expanded bead is smaller than the amount of the polylactic acid crystal components that constitute the center region of the expanded bead. This means that, when the expanded bead is sufficiently heat treated, the degree of crystallinity of the polylactic acid in the center region is increased. Because of the improved degree of crystallinity of the polylactic acid in the center region of the expanded bead, the expanded bead can meet the above formula (7) and can show improved heat resistance, etc. as a whole. On the other hand, since the polylactic acid in the surface region of the expanded bead has a lower degree of crystallinity as compared with that in the center region of the expanded bead even when the expanded bead is sufficiently heat treated, the softening point of surface region of the expanded bead is low. Therefore, the expanded bead which satisfies the relationship shown in the formula (8) is capable of showing excellent fusion bonding between the expanded beads during an in-mold molding stage, irrespective of the thermal history before and after the fabrication of the expanded beads. From this point of view, the endothermic calorific value (Brs:endo) of the surface region of the expanded bead is preferably 35 J/g or less (inclusive of 0) for reasons of improved fusion bonding property of the expanded bead. For reasons of improved heat resistance and mechanical strengths of the expanded bead, the endothermic calorific value (Brc:endo) of the center region of the expanded bead is preferably 30 to 40 J/g. It is also preferred that between (Brc:endo) and (Brs:endo) there is a difference in calorific value of at least 3 J/g, more preferably at least 4 J/g. Meanwhile, as long as the formula (8) is met, the polylactic acid that constitutes the surface region of the expanded bead may be non-crystalline polylactic acid or a mixture of non-crystalline polylactic acid and crystalline polylactic acid.

As used herein, the endothermic calorific value (Br:endo) [J/g] of the whole expanded bead, the endothermic calorific value (Brs:endo) [J/g] of a surface region of the expanded bead and the endothermic calorific value (Brc:endo) [J/g] of a center region of the expanded bead are values as determined in accordance with heat flux differential scanning calorimetry referenced in JIS K7122 (1987) under the following Condition 2.

Condition 2

[Preparation of Measurement Specimens]

<Specimen for Measuring the Endothermic Calorific Value of the Whole Expanded Bead>

The expanded bead is basically used as a measurement specimen as such without cutting.

<Specimen for Measuring the Endothermic Calorific Value of the Surface Region of the Expanded Bead>

A surface portion of the expanded bead, including an exterior surface thereof, is cut out and collected to obtain a measurement specimen, such that the entire exterior surface thereof is removed and the measurement specimen has a weight of ⅙ to ¼ the weight of the expanded bead before being cut. More specifically, the expanded bead is cut using a cutter knife, microtome or the like for collecting the surface portion as the measurement specimen. In this case, it should be borne in mind that the entire exterior surface of the expanded bead should be removed and the weight of the surface portion removed from the bead should be within the range of ⅙ to ¼ the weight of the expanded bead before being cut. In this case, the thickness of the surface portion removed should be as equal as possible <Specimen for Measuring the Endothermic Calorific Value of the Center Region of the Expanded Bead>

An entire surface portion of the expanded bead is cut away to leave a measurement specimen, such that the measurement specimen has a weight of ⅕ to ⅓ the weight of the expanded bead before being cut. More specifically, the expanded bead is cut using a cutter knife or the like for the purpose of obtaining an inside region of the foam of the expanded bead which region does not include the exterior surface of the expanded bead. It should be borne in mind that the entire exterior surface of the expanded bead should be removed and a center region of the expanded bead which has a weight of ⅕ to ⅓ the weight of the expanded bead before being cut should be cut out, with the center of the center region being made as close to the center of the expanded bead as possible. In this case, the shape of the measurement specimen thus cut out is desired to be as similar as possible to the shape of the expanded bead.

[Measurement of Endothermic Calorific Values]

The calorific values (Br:endo), (Brs:endo) and (Brc:endo) are values as determined from DSC curves obtained by first subjecting each of the expanded bead, the measurement specimen obtained from the surface region of the expanded bead and the measurement specimen obtained from the center region of the expanded bead to a heat treatment in which 1 to 4 mg of each of them is heated, for melting, to a temperature higher by 30° C. than a fusion peak ending temperature, then maintained at that temperature for 10 minutes, then cooled to 110° C. at a cooling speed of 10° C./min and then maintained at that temperature for 120 min, and then cooling the resulting sample to 30° C. at a cooling speed of 10° C./min, each of the thus heat treated specimens being subsequently heated again, for melting, to a temperature higher by 30° C. than a fusion peak ending temperature at a heating speed of 5° C./min to obtain the DSC curve (hereinafter occasionally referred to as "second time DSC curve (II)") in accordance with heat flux differential scanning calorimetry referenced in JIS K7122 (1987). When the amount of the measurement specimen sampled for measurement of (Brs:endo) or (Brc:endo) is less than the intended amount of 1 to 4 mg, the above-described sampling procedure should be repeated for two or more expanded beads until the measurement specimen in the intended amount of 1 to 4 mg is collected. When the weight of one expanded bead sampled for measurement of (Br:endo) exceeds 4 mg, the expanded bead should be divided into parts with an equal shape (such as into halves) so that the measurement specimen has a weight within the range of 1 to 4 mg.

Figure 4:
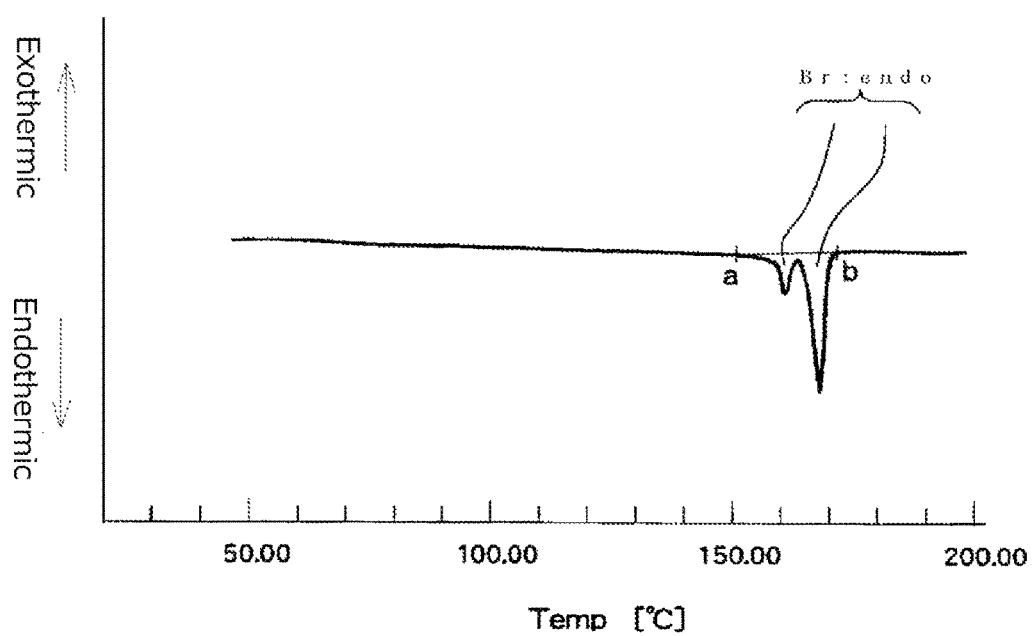
FIG. 4 illustrates an example of a second time DSC curve (II) showing an endothermic calorific value (Br:endo) of a measurement sample as measured with a heat flux differential scanning calorimeter.
Figure 5:
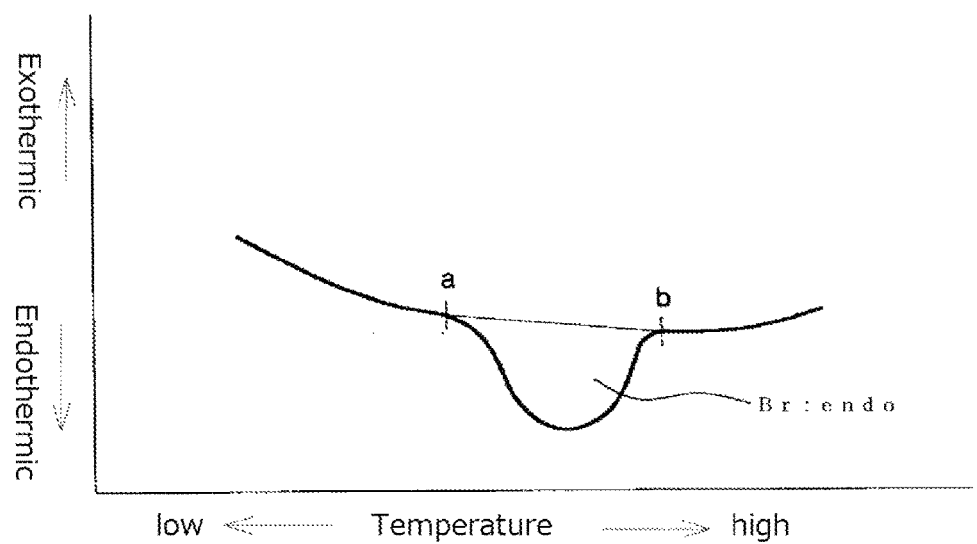
FIG. 5 illustrates an example of a second time DSC curve (II) showing an endothermic calorific value (Br:endo) of a measurement sample as measured with a heat flux differential scanning calorimeter.

FIG. 4 shows a second time DSC curve (II) in which a point "a" is a point where an endothermic peak begins separating from a low temperature-side base line and a point "b" is a point where the endothermic peak returns to a high temperature-side base line. The endothermic calorific value (Br:endo) is an area defined by a line passing the points "a" and "b" and the DSC curve. The DSC device should be preferably operated so that the base line is as straight as possible. When the base line is inevitably curved as shown in FIG. 5, the curved base line on the low temperature side is extended to the high temperature side with the radius of the curvature of the base line being maintained. The point at which the endothermic peak begins separating from the low temperature side curved base line is the point "a". Similarly, the curved base line on the high temperature side is extended to the low temperature side with the radius of the curvature of the base line being maintained. The point at which the endothermic peak returns to the high temperature side curved base line is the point "b". The endothermic calorific values (Brs:endo) and (Brc:endo) may also be obtained from their second DSC curves (II) by drawing base lines in the same manner as in the case of (Br:endo) and may be each determined from the area defined by a line passing the points "a" and "b" and the DSC curve.

In the above-described measurement of the endothermic calorific values (Br:endo), (Brs:endo) and (Brc:endo), each of the specimens is measured for its DSC curve under conditions including the maintenance at 110° C. for 120 minutes. This is for the purpose of determining the endothermic calorific values (Br:endo), (Brs:endo) and (Brc:endo) in the state in which crystallization of the PLA resin of each specimen has been allowed to proceed as much as possible.

The endothermic calorific values (Br:endo), (Brs:endo) and (Brc:endo) determined from the expanded beads that are used for a molded article are nearly the same as those determined from the expanded beads that are sampled from the molded article as long as the sampling of the measurement specimens is carried out precisely. Namely, the endothermic calorific values (Br:endo), (Brs:endo) and (Brc:endo) do not vary depending upon the thermal history of the expanded beads. Accordingly, the endothermic calorific values (Br:endo), (Brs:endo) and (Brc:endo) of the expanded beads from which a molded article is formed may be determined according to the above-described Condition 2 from the expanded beads that have been used for producing the molded article or from the expanded beads that are sampled from the molded article.

In the present invention, since the expanded beads from which a molded article is produced have the above-described specific endothermic calorific value (Br:endo) as a whole, the molded article obtained from the expanded beads has excellent mechanical strengths and compressive strength at high temperatures, when such expanded beads are in-mold molded after having been subjected to a heat treatment or when the molded article obtained from the expanded beads is subjected to a heat treatment. Further, when the endothermic calorific value (Brs:endo) of the surface region of the expanded bead is lower than the endothermic calorific value (Brc:endo) of the center region thereof, the softening point of the surface of the expanded beads may be maintained in a low level, the expanded beads show excellent fusion bonding property at the time of in-mold molding.

It is particularly preferred that the expanded beads used for in-mold molding are such that an endothermic calorific value (Bfc:endo) [J/g] and an exothermic calorific value (Bfc:exo) of a center region of the expanded bead before being subjected to the heat treatment, which values are determined in accordance with heat flux differential scanning calorimetry referenced in JIS K7122 (1987) under Condition 3 shown below, meet the following formula (9):

$$40 > [(Bfc:endo) - (Bfc:exo)] > 10 \quad (9)$$

Condition 3
[Preparation of Measurement Specimen]
[Measurement Specimen for Measuring Endothermic Calorific Value and Exothermic Calorific Value of the Center Region of the Expanded Bead]

In the same manner as the preparation method for the specimen for measuring the endothermic calorific value of the center region of the expanded bead that is described in Condition 2, an entire surface portion of the expanded bead is cut away to leave a measurement specimen, such that the measurement specimen has a weight of ⅕ to ⅓ the weight of the expanded bead before being cut.

[Measurement of Endothermic Calorific Value and the Exothermic Calorific Value]

The endothermic calorific value (Bfc:endo) and the exothermic calorific value (Bfc:exo) are determined from a DSC curve (first time DSC curve (I)) obtained by heating, for melting, 1 to 4 mg of the measurement specimen, sampled from the center region of the expanded bead, from 23° C. to a temperature higher by 30° C. than a fusion peak ending temperature at a heating speed of 10° C./min in accordance with heat flux differential scanning calorimetry referenced in JIS K7122 (1987). When the amount of the measurement specimen sampled from one expanded bead is less than the intended amount of 1 to 4 mg, the above-described sampling procedure should be repeated for a plurality of expanded beads until 1 to 4 mg of a measurement specimen is collected.

The difference [(Bfc:endo)−(Bfc:exo)] in the above formula (9) represents a difference between the endothermic calorific value (Bfc:endo) that is an energy absorbed when the crystals, which are originally contained in the center region of the expanded bead before the heat flux differential scanning calorimetry measurement is carried out, and crystals, which have been formed in the center region of the expanded bead during the course of heating in the measurement, are melted and the exothermic calorific value (Bfc:exo) that is an energy emitted when the center region of the expanded bead crystallizes during the course of heating in the heat flux differential scanning calorimetry measurement. The fact that the difference is small means that crystallization of the center region of the expanded bead has not yet proceeded before the heat flux differential scanning calorimetry is carried out, while the fact that the difference is large and is near the endothermic calorific value (Bfc:endo) means that crystallization of the center region of the expanded bead has already fully proceeded before the heat flux differential scanning calorimetry is carried out. The difference [(Bfc:endo)−(Bfc:exo)] is preferably within the above-described range for reasons that good secondary expansion property of the expanded bead during an in-mold molding stage is achieved and, further, the range of the molding temperature within which good expanded beads molded articles are obtainable becomes wide. The difference is more preferably 35 J/g or less, particularly preferably 30 J/g or less, from the view point of the secondary expansion property.

From the view point of easiness in controlling the temperature of in-mold molding step as well as prevention of shrinkage of the in-mold molded articles, the difference [(Bfc:endo)−(Bfc:exo)] is preferably 15 J/g or more, particularly preferably 20 J/g or more.

It is also preferred that the endothermic calorific value (Bfc:endo) of the expanded bead of the present invention is 25 to 40 J/g. With an increase of the endothermic calorific value (Bfc:endo), the degree of crystallinity of the PLA resin of which the expanded bead is formed becomes higher upon a heat treatment of the expanded bead. Thus, a high (Bfc:endo) is desirable because a molded article having higher mechanical strengths may be prepared. In the present invention, however, the endothermic calorific value (Bfc:endo) is preferably within the above range from the standpoint of achievement of molecular orientation of the resin during the foaming stage for improving the physical properties thereof. When the endothermic calorific value (Bfc:endo) is excessively small, on the other hand, there is a possibility that the mechanical strengths, especially mechanical strengths at high temperatures, of the final molded article is unsatisfactory. From this point of view, (Bfc:endo) is more preferably 30 to 40 J/g.

The exothermic calorific value (Bfc:exo)] is preferably 5 to 30 J/g, more preferably 10 to 25 J/g, for reasons of good secondary expansion property and fusion bonding property of the expanded beads, provided that difference [(Bfc:endo)−(Bfc:exo)] meets with the above requirement. The fact that the exothermic calorific value (Bfc:exo) is high means that crystallization of the PLA resin in the center region of the expanded bead has not yet proceeded before the heat flux differential scanning calorimetry measurement.

The exothermic calorific value (Bfc:exo) and the endothermic calorific value (Bfc:endo) as used herein are determined by the heat flux differential scanning calorimetry (Condition 3) as referenced in JIS K7122 (1987), as described previously. The measurement of the exothermic calorific value (Bfc:exo) and the endothermic calorific value (Bfc:endo) is carried out as follows.

In a first time DSC curve (I), when a point where the exothermic peak begins separating from a low temperature-side base line of the exothermic peak is assigned as point "c" and a point where the exothermic peak returns to a high temperature-side base line is assigned as point "d", the exothermic calorific value (Bfc:exo) of the expanded beads is a calorific value determined from the area defined by a line passing the points "c" and "d" and the DSC curve. In the first time DSC curve (I), when a point where the fusion peak begins separating from a low temperature-side base line is assigned as point "e" and a point where the endothermic peak returns to a high temperature-side base line is assigned as point "f", the endothermic calorific value (Bfc:endo) of the expanded beads is a calorific value determined from the area defined by a line passing the points "e" and "f" and the DSC curve. The DSC device should be preferably operated so that the base line of the first time DSC curve (I) is as straight as possible. When the base line is inevitably curved, the curved base line on the low temperature side of the exothermic peak is extended to the high temperature side with the radius of the curvature of the base line being maintained. The point at which the exothermic peak begins separating from the low temperature side curved base line is the point "c". Similarly, the curved base line on the high temperature side of the exothermic peak is extended to the low temperature side with the radius of the curvature of the base line being maintained. The point at which the exothermic peak returns to the high temperature side curved base line is the point "d". Further, the curved base line on the low temperature side of the endothermic peak is extended to the high temperature side with the radius of the curvature of the base line being maintained. The point at which the endothermic peak begins separating from the low temperature side curved base line is the point "e". Similarly, the curved base line on the high temperature side of the endothermic peak is extended to the low temperature side with the radius of the curvature of the base line being maintained. The point at which the endothermic peak returns to the high temperature side curved base line is the point "f".

Figure 6:
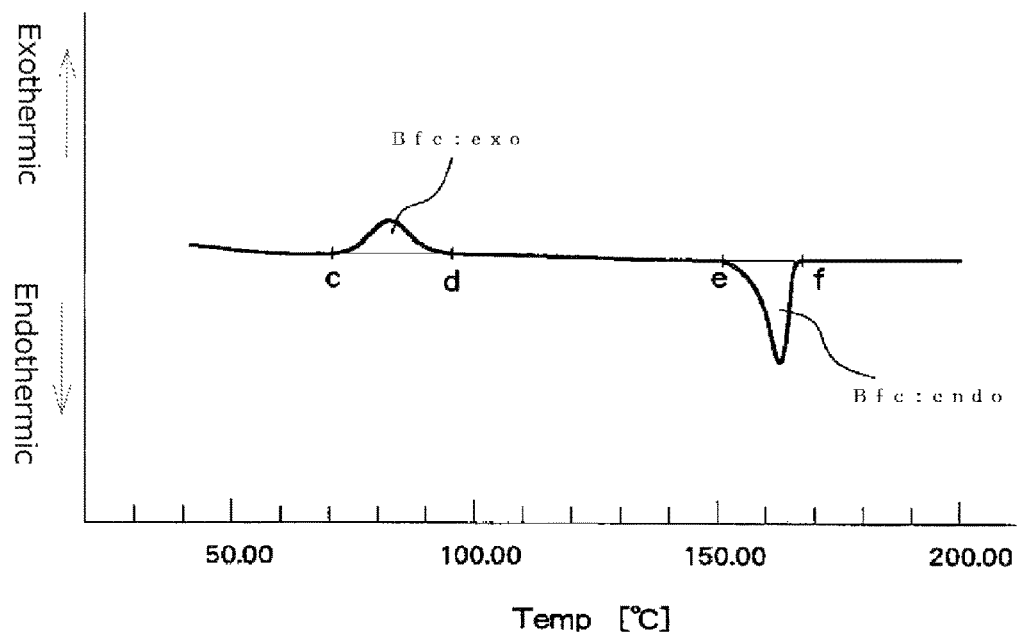
FIG. 6 illustrates an example of a first time DSC curve (I) showing an exothermic calorific value (Bfc:exo) and an endothermic calorific value (Bfc:endo) of a measurement sample as measured with a heat flux differential scanning calorimeter.
Figure 7:
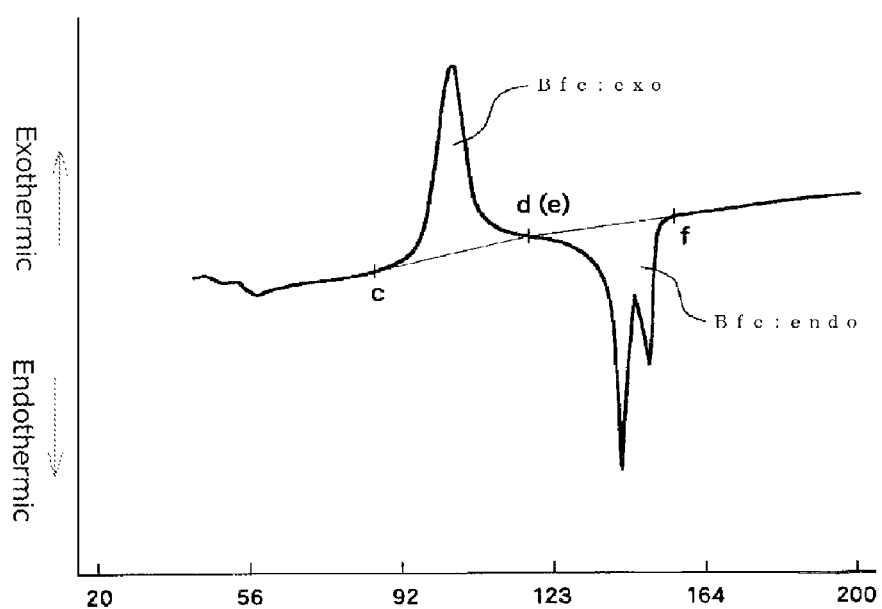
FIG. 7 illustrates an example of a first time DSC curve (I) showing an exothermic calorific value (Bfc:exo) and an endothermic calorific value (Bfc:endo) of a measurement sample as measured with a heat flux differential scanning calorimeter.
Figure 8:
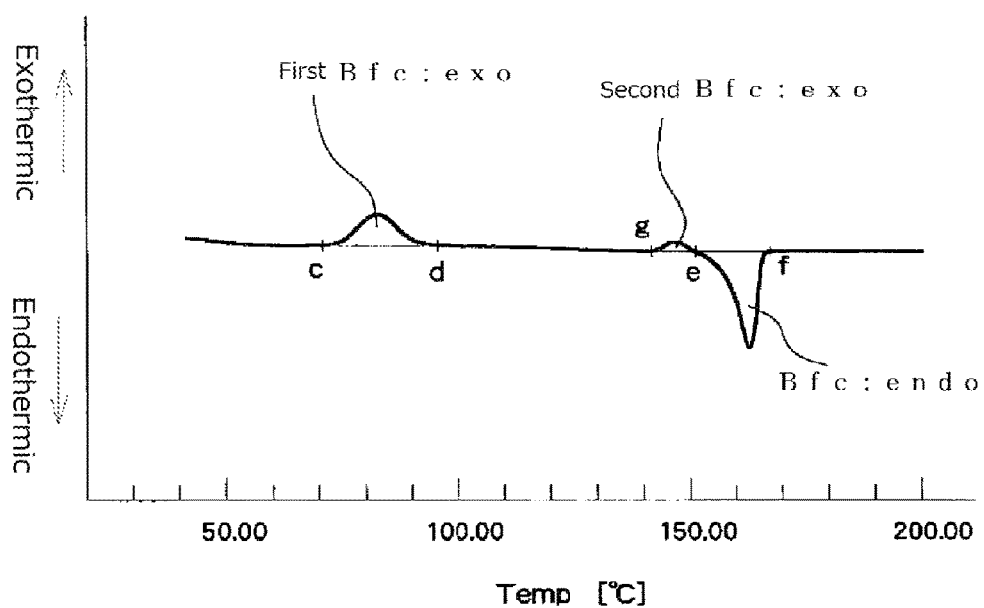
FIG. 8 illustrates an example of a first time DSC curve (I) showing an exothermic calorific value (Bfc:exo) and an endothermic calorific value (Bfc:endo) of a measurement sample as measured with a heat flux differential scanning calorimeter.

In the case of FIG. 6, for example, an exothermic calorific value (Bfc:exo) of the expanded bead is a calorific value determined from the area which is defined by the straight line passing the points "c" and "d", that are determined in the manner described above, and the DSC curve and which represents the generated calorific value, while an endothermic calorific value (Bfc:endo) is a calorific value determined from the area which is defined by the straight line passing the points "e" and "f" and the DSC curve and which represents the absorbed calorific value. In the case of FIG. 7, it is difficult to determine points "d" and "e" by the above-described method. Thus, in the illustrated case, points "c" and "f" are first determined by the above-described method and a point at which the straight line passing the points "c" and "f" intersects the DSC curve is assigned as the point "d" (also point "e"), whereupon the exothermic calorific value (Bfc:exo) and the endothermic calorific value (Bfc:endo) of the expanded beads are determined. As shown in FIG. 8, there is a case in which a small exothermic peak exists on a low temperature side of the endothermic peak. In such a case, the exothermic calorific value (Bfc:exo) is determined from a sum of an area "A" of the first exothermic peak and an area "B" of the second exothermic peak in FIG. 8. Namely, when a point where the exothermic peak begins separating from a low temperature-side base line of the first exothermic peak is assigned as point "c" and a point where the first exothermic peak returns to a high temperature-side base line is assigned as point "d", the area "A" is an area defined by a straight line passing the points "c" and "d" and the DSC curve and represents the generated calorific value. On the other hand, when a point where the exothermic peak begins separating from a low temperature-side base line of the second exothermic peak is assigned as point "g" and a point where the endothermic peak returns to a high temperature-side base line is assigned as point "f", and when a point where a straight line passing the points "g" and "f" intersects the DSC curve is assigned as point "e", the area "B" is an area defined by a straight line passing the points "g" and "e" and the DSC curve and represents the generated calorific value. In FIG. 8, the endothermic calorific value (Bfc:endo) is a calorific value determined from the area which is defined by the straight line passing the points "e" and "f" and the DSC curve and which represents absorbed calorific value.

The expanded beads of the present invention preferably have an apparent density of 24 to 240 g/L, more preferably 40 to 200 g/L, from the standpoint of excellence in lightness in weight, in-mold moldability, mechanical strengths and in-mold moldability. When the apparent density is excessively small, there is a possibility that a large shrinkage degree may result after in-mold molding process. When the apparent density is excessively high, on the other hand, there is a possibility that a large variation of the apparent density may be apt to result. This causes variation of expandability, fusion bonding property and apparent density of the expanded beads at the time of being heated in a mold cavity and, hence results in deterioration of the physical properties of the obtained molded articles.

As used herein, the apparent density of the expanded beads is measured by the following method. The expanded beads are allowed to stand for aging in a constant temperature and humidity room at 23° C. under atmospheric pressure and a relative humidity of 50% for 10 days. In the same room, about 500 mL of the aged expanded beads are weighed to determine their weight W1 (g). The weighed expanded beads are immersed in water at 23° C. contained in a measuring cylinder using a wire net or the like tool. From a rise of the water level volume, the volume V1 (L) of the expanded beads placed in the measuring cylinder is determined by subtracting the volume of the wire net and the like tool placed therein. The apparent density (g/L) is calculated by dividing the weight W1 of the expanded beads placed in the measuring cylinder by the volume V1 (W1/V1).

The expanded beads of the present invention preferably have an average cell diameter of 30 to 500 μm, more preferably 50 to 250 µm, from the standpoint of their in-mold moldability and improved appearance of the molded article obtained therefrom.

The average cell diameter of the expanded beads is measured as follows. One expanded bead is cut into nearly equal halves. From an enlarged image of the cross section taken by a microscope, the average cell diameter is determined. Namely, on the enlarged image of the cross section of the expanded bead, four line segments each passing nearly through the center of the cross section and extending from one surface of the expanded bead to the other surface thereof are drawn such that eight angularly equally spaced straight lines extend radially from nearly the center of the cross section toward the external surface of the expanded bead. The number of the cells that intersect each of the four lines is counted. The total number N of the cells that intersect the above four line segments is counted. Also measured is a total length L (µm) of the four line segments. The value (L/N) obtained by dividing the total length L by the total number N is an average cell diameter of the one expanded bead. Similar procedures are repeated for randomly-selected 10 expanded beads in total. The arithmetic mean of the average cell diameters of the ten expanded beads represents the average cell diameter of the expanded beads.

The expanded beads of the present invention preferably have a closed cell content of 80% or more, more preferably 85% or more, still more preferably 90% or more from the standpoint of excellence in in-mold moldability of the expanded beads and capability of providing sufficient mechanical strengths of a molded article produced therefrom.

As used herein, the closed cell content of the expanded beads is measured as follows. The expanded beads are allowed to stand for aging in a constant temperature and humidity room at 23° C. under atmospheric pressure and a relative humidity of 50% for 10 days. In the same room, about 20 cm³ bulk volume of the expanded beads thus aged are sampled and measured for the precise apparent volume Va by a water immersion method. The sample whose apparent volume Va has been measured is fully dried and measured for its true volume Vx according to Procedure C of ASTM D-2856-70 using Air Comparison Pycnometer Type-930 manufactured by Toshiba Beckman Inc. From the volumes Va and Vx, the closed cell content is calculated by the formula (10) shown below. The average (N=5) is the closed cell content of the expanded beads.

$$\text{Closed cell content}(\%)=(Vx-W/\rho)\times 100/(Va-W/\rho) \quad (10)$$

wherein

Vx represents the true volume (cm³) of the expanded beads measured by the above method, which corresponds to a sum of a volume of the resin constituting the expanded beads and a total volume of all the closed cells of the expanded beads, Va represents an apparent volume (cm³) of the expanded beads, which is measured by a rise of the water level when the expanded beads are immersed in water contained in a measuring cylinder, W is a weight (g) of the sample expanded beads used for the measurement; and $\rho$ is a density (g/cm³) of the resin constituting the expanded beads.

The expanded beads of the present invention give, upon being subjected to in-mold molding, a molded article. The shape of the molded article is not specifically limited. Not only molded article with a plate-like, columnar, vessel-like or block-like form but also a molded article with a complicated three-dimensional shape or an article with a large thickness may be produced. The molded articles may be suitably used in various applications such as packaging vessels, interior materials for automobiles, cushioning materials and core materials of FRP.

The molded article of the present invention, in which the PLA resin is considered to be molecularly oriented as a result of stretching of cell walls during expansion of the expanded beads, shows excellent compressive strength and bending modulus. Further, when the expanded beads have a high temperature peak as described above, fusion bonding therebetween is improved so that the dimensional stability and mechanical strengths are further improved. Incidentally, when the molded article is heat treated (heat set) for sufficiently increasing the degree of crystallinity of the PLA resin, more excellent heat resistance can be achieved.

The molded article of the present invention preferably has a density of 15 to 150 g/L, more preferably 25 to 125 g/L, for reasons of lightness in weight and excellence in mechanical strength.

The molded article of the present invention, which is obtained by in-mold molding of the excellent expanded beads as described above, shows excellent mechanical strengths and has a relationship between its density and its bending modulus which satisfies the formula (4) shown below, preferably the formula (11) shown below:

$$\text{(Bending modulus (MPa) of the molded article)}/\text{(Density (g/L) of the molded article)} \geq 0.20 \text{ (MPa·L/g)} \quad (4)$$

$$\text{(Bending modulus (MPa) of the molded article)}/\text{(Density (g/L) of the molded article)} \geq 0.23 \text{ (MPa·L/g)} \quad (11)$$

The molded article preferably has a closed cell content of 50% or more, more preferably 60% or more, still more preferably 70% or more. When the closed cell content is excessively low, there is a possibility that the mechanical strengths such as compressive strength of the expanded beads molded article is deteriorated.

The closed cell content of the molded article may be determined in the same manner as that for the measurement of the closed cell content of the expanded beads except that a measurement sample with a size of 25×25×30 mm is cut out from a center part of the molded article (skin should be completely cut off).

The degree of fusion bonding of the molded article is preferably 50% or more, more preferably 60% or more, particularly preferably 80% or more. The molded article having a high degree of fusion bonding excels in mechanical strengths, particularly in bending strength. The degree of fusion bonding is intended to refer to a percentage of the expanded beads which undergo material failure when the molded article is ruptured, based on the all expanded beads present on the ruptured cross section. When all the expanded beads in the ruptured cross section undergo material failure, the degree of fusion bonding is 100%. Those beads which are not fuse-bonded to each other do not undergo material failure in the ruptured cross section but are separated from each other at their interface.

A method for preparing the expanded beads of the present invention will be next described. As the preferred method for preparing the expanded beads of the present invention, there may be mentioned a dispersing medium release foaming method. By adopting the dispersing medium release foaming method, it is easy to control stretching of cell walls, formation of the high temperature peak and the calorific value of the high temperature peak at the time of foaming.

The dispersing medium release foaming method is a method including melting and kneading a PLA resin in an extruder, extruding the kneaded resin in the form of strands, cutting the extrudate to obtain resin particles, dispersing the resin particles in an aqueous dispersing medium contained in a pressure resisting vessel, impregnating a physical blowing agent into the resin particles, while heating them, to obtain foamable resin particles, and releasing the foamable resin particles together with the aqueous dispersing medium, at a high temperature and a high pressure, from the pressure resisting vessel into a lower pressure atmosphere to obtain expanded beads. In this method, while a resin particle preparation step, a blowing agent impregnation step and a foaming step may be performed separately, the blowing agent impregnation step and the foaming step are generally carried out in a single stage.

In the resin particle preparation step, resin particles may be prepared by extruding a PLA resin into which required additives have been incorporated, the extrudate being then pelletized by, for example, a strand cutting method or an under-water cutting method. When the above-described multi-layered resin particles each composed of a core layer and an outer layer are intended to be produced, there may be utilized a coextrusion molding technique which is disclosed in, for example, Japanese Kokoku Publications Nos. JP-B-S41-16125, JP-B-S43-23858 and JP-B-S44-29522 and Japanese Kokai Publication No. JP-A-S60-185816 and which uses, for example, a device including an extruder for forming the core layer, an extruder for forming the outer layer, and a coextrusion die connected to each of the extruders.

In pelletization in the resin particle preparation step, a PLA resin and, if needed, additives are fed to an extruder and melted and kneaded. The molten kneaded mass thus obtained is extruded in the form of strands through small holes of a mouthpiece attached to a die exit at a tip of the extruder. The extruded strands are cooled by being immersed in water and then cut with a pelletizer such that the resin particles obtained each have a specific weight, whereby resin particles are obtained. Alternatively, such resin particles may be obtained by cutting the extruded strands into resin particles each have a specific weight, the resin particles being cooled after or simultaneous with the cutting.

The resin particles preferably have an average weight per one particle of 0.05 to 10 mg, more preferably 0.1 to 4 mg. When the average weight is excessively small, it is necessary to use a special production method. When the average weight is excessively large, on the other hand, there is a possibility that the expanded beads obtained therefrom have a broad density distribution and cannot be filled in a mold cavity in an efficient manner at the time of molding. The shape of the resin particles may be, for example, a cylindrical column, a sphere, a rectangular column, an oval sphere or a cylinder. Expanded beads obtained by foaming and expanding the resin particles have a shape that is similar to that of the resin particles before expansion.

When the resin particles are produced by melting and kneading the PLA resin with an extruder followed by extrusion into strands, it is preferable to dry the PLA resin before kneading for reasons of prevention of degradation of the PLA resin by hydrolysis. In order to suppress degradation of the PLA resin by hydrolysis, a method using an extruder provided with a vent hole may also be adopted so that moisture is removed from the PLA resin by evacuation through the vent hole. The removal of moisture from the PLA resin may permit the prevention of the generation of air bubbles in the resin particles and may improve the stability of the extrusion procedures.

Description will be next made of the blowing agent impregnation step and foaming step of the dispersing medium release foaming method. In one embodiment of the dispersing medium release foaming method, the resin particles are impregnated with a physical blowing agent to form foamable resin particles, for example, by heating, in a pressure resisting vessel, the resin particles dispersed in a dispersing medium together with a physical blowing agent, or by first dispersing and heating the resin particles in a dispersing medium in a pressure resisting vessel, a blowing agent being subsequently injected into the pressure resisting vessel. The obtained foamable resin particles in a molten state are then released together with the dispersing medium into a zone having a lower temperature and lower pressure than those in the high temperature and high pressure resisting vessel so that the foamable resin particles are allowed to foam and expand to obtain the expanded beads.

An additive may be previously incorporated into the resin particles for the purpose of controlling the apparent density and cell diameter of the obtained expanded beads. Examples of the additive include an inorganic powder such as talc, calcium carbonate, borax, zinc borate, aluminum hydroxide and silica, and a polymer such as polytetrafluoroethylene, polyethylene wax, polycarbonate and crosslinked polystyrene. Among the above additives, polytetrafluoroethylene, polyethylene wax and crosslinked polystyrene are preferred. Particularly preferred is hydrophobic polytetrafluoroethylene powder.

In incorporation of the additive into the PLA resin, the additive may be kneaded as such together with the PLA resin in the pelletization step. For reasons of improved dispersibility, however, it is preferred that the additive is formed into a master batch and the master batch be kneaded with the PLA resin.

Since the apparent density and cell diameter of the expanded beads according to the present invention vary depending upon the blending amount of the additive, it is expected that the additive has an effect of controlling these properties. The amount of the additive is generally 0.001 to 5 parts by weight, preferably 0.005 to 3 parts by weight, more preferably 0.01 to 2 parts by weight, per 100 parts by weight of the PLA resin. Within such a range, it is possible to reduce the apparent density (to increase the expansion ratio) and to uniformize the cell diameter of the expanded beads.

Since the PLA resin is easily hydrolyzed, the additive to be blended with the PLA resin is desired to be selected from hydrophobic substances while avoiding the use of a hydrophilic substance as much as possible. Thus, when a hydrophobic additive is used, it is possible to obtain an effect of the additive while preventing degradation of the PLA resin due to hydrolysis.

The high temperature peak of the expanded beads of the present invention may develop when resin particles are heat treated, at a temperature at which crystals thereof are not completely melted, when the resin particles are impregnated with a blowing agent in a pressure resisting vessel with heating. The heat treatment is carried out by holding the resin particles at a specific temperature and for a specific period of time as described below. The temperature at which the high temperature peak is allowed to develop is generally in the range from [melting point minus 30° C.] to [melting point minus 10° C.] where the melting point is that of the PLA resin of which the resin particles are formed, although the temperature varies depending upon the kind of the blowing agent and the aimed apparent density of the expanded beads. The heat treatment time is generally 5 to 60 minutes, preferably 5 to 15 minutes. Too long a heat treatment time may cause hydrolysis of the PLA resin and is not preferred. Thus, the resin particles are preferably held in the above temperature range for at least 5 minutes in order for the a temperature peak to develop in the expanded beads.

As described above, in the dispersing medium release foaming method, resin particles are dispersed in a dispersing medium, such as, water in a pressure resisting vessel, such as an autoclave, to which a blowing agent is fed under a pressure in a predetermined amount. The dispersion is then stirred at an elevated temperature for a predetermined time to impregnate the blowing agent into the resin particles to obtain foamable resin particles. The resin particles in the molten state and the dispersing medium in the vessel are then released from the high temperature and high pressure vessel into a lower temperature and lower pressure atmosphere to obtain the expanded beads. At the time of the release, it is preferred that the contents in the vessel are discharged while applying a back pressure to space in the vessel.

When particularly low apparent density (high expansion ratio) expanded beads are to be produced, there may be adopted so-called two-step expansion in which expanded beads produced in the above method are aged in an atmospheric pressure in the customarily employed manner, then charged again in a pressure resisting vessel, then subjected to a pressurizing treatment using a pressurized gas such as air so that the internal pressure of the expanded beads is increased to 0.01 to 0.10 MPa(G) and, finally, heated in the expansion vessel with a heating medium, such as hot wind, steam or a mixture of steam and air, to obtain the desired expanded beads with a high expansion ratio.

In the production of expanded beads of the present invention, it is desired that the foamable resin particles prepared using a PLA resin that satisfies the above conditions (1) to (3) are released to a low pressure zone at such a temperature condition in which a temperature range in which the PLA resin can be properly foamed overlaps a temperature range in which the PLA resin that forms the cell walls as a result of stretching of the resin particles can be properly oriented. In order to enable the overlapping of the above temperature requirement, such a PLA resin as to satisfy the above conditions (1) to (3) is employed in the present invention. To be more specific, the foaming temperature is preferably between (melting point minus 10° C.) to (melting point minus 30° C.), more preferably between (melting point minus 15° C.) to (melting point minus 25° C.), where the melting point is that of the PLA resin. When the foaming temperature is excessively low, it is difficult to obtain expanded beads with a low apparent density. When excessively high, on the other hand, shrinkage of the expanded beads is apt to occur and, thus, there is a possibility that the mechanical properties of molded articles obtained by in-mold molding of the obtained beads are deteriorated. In order to obtain expanded beads in which the resin forming cell walls as a result of foaming is stretched and molecularly oriented and which have excellent mechanical strengths, it is preferred that the expanded beads immediately after the foaming are rapidly cooled. When the expanded beads after the foaming are rapidly cooled to a temperature lower than the glass transition temperature of the PLA resin particles, the mobility of non-crystalline molecular chains in the molecularly oriented state decreases so that a high stretching effect may be obtained. For this reason, shrinkage of the expanded beads may also be prevented by the rapid cooling. Examples of the method for rapidly cooling the expanded beads include a method in which air as a cooling medium is fed to the atmosphere where the expansion has been completed, a method in which water as a cooling medium is fed to the atmosphere where the expansion has been completed, and a method in which the resin particles are allowed to foam and expand in water contained in a tank.

As the dispersing medium in which the resin particles are dispersed, water is preferred. However, other than water, a dispersing medium that does not dissolve the polylactic acid resin particles may be used.

A dispersing agent or a dispersing aid may be added to the dispersing medium, if necessary, in dispersing the resin particles in the dispersing medium. Examples of the dispersing agent include inorganic substances such as aluminum oxide, tribasic calcium phosphate, magnesium pyrophosphate, titanium oxide, zinc oxide, basic magnesium carbonate, basic zinc carbonate, calcium carbonate, kaolin, mica and clay; and water soluble polymer protective colloid agents such as polyvinylpyrrolidone, polyvinyl alcohol and methyl cellulose. The dispersing medium may also be incorporated with a dispersing aid such as an anionic surfactant, e.g. sodium dodecylbenzenesulonate and sodium alkanesulfonate.

The dispersing agent may be used in an amount of 0.05 to 3 parts by weight per 100 parts by weight of the resin particles, while the dispersing aid may be used in an amount of 0.001 to 0.3 part by weight per 100 parts by weight of the resin particles.

As the physical blowing agent, there may be used, for example, organic physical blowing agents such as hydrocarbons (e.g. butane, pentane and hexane), and halogenated hydrocarbons (e.g. 1,1-difluoroethane and dichloromethane) and inorganic physical blowing agents such as inorganic gas (e.g. carbon dioxide, nitrogen and air) and water. These physical blowing agents may be used singly or in combination of two or more thereof. Among the physical blowing agents, those which are composed mainly of an inorganic physical blowing agent such as carbon dioxide, nitrogen and air are preferably used. Carbon dioxide is particularly preferred. The term "physical blowing agent composed mainly of an inorganic physical blowing agent" as used herein is intended to refer to a physical blowing agent which contains at least 50% by mole, preferably at least 70% by mole, more preferably at least 90% by mole, of an inorganic physical blowing agent in 100% by mole of the total physical blowing agent.

The amount of the physical blowing agent is determined as appropriate in consideration of the kind of the blowing agent, amount of the additives, the apparent density of the desired expanded beads, etc. For example, the inorganic physical blowing agent is used in an amount of about 0.1 to 30 parts by weight, preferably 0.5 to 15 parts by weight, more preferably 1 to 10 parts by weight, per 100 parts by weight of the PLA resin.

Description will next be made of a method for producing a molded article using the expanded beads of the present invention. For the preparation of a molded article, any known in-mold molding method may be adopted. In the present invention, an expanded beads molded article may be easily obtained by molding the expanded beads preferably having a high temperature peak in a mold cavity in any known method. Examples of such a method include a compression molding method, a cracking molding method, a pressure molding method, a compression filling molding method and an ambient pressure filling molding method, in each of which a conventional mold for expanded beads is used (see, for example, Japanese Kokoku Publications No. JP-B-S46-38359, No. JP-B-S51-22951, No. JP-B-H04-46217, No. JP-B-H06-22919 and No. JP-B-H06-49795).

As the generally preferably adopted in-mold molding method, there may be mentioned a batch-type in-mold molding method in which expanded beads are filled in a mold cavity of a conventional mold for thermoplastic resin expanded beads adapted to be heated and cooled and to be opened and closed. Steam having a saturation vapor pressure of 0.01 to 0.25 MPa(G), preferably 0.01 to 0.20 MPa(G), is then fed to the mold cavity to heat the expanded beads and to foam, expand and fuse bond the beads together. The obtained molded article is then cooled and taken out of the mold cavity.

The feed of the steam may be carried out by a conventional method such as a combination of one-direction flow heating, reversed one-direction flow heating and both-direction flow heating. The particularly preferred heating method includes preheating, one-direction flow heating, reversed one-direction flow heating and both-direction flow heating which are successively performed in this order.

The molded article may be also produced by a continuous in-mold molding method in which the expanded beads are fed to a mold space which is defined between a pair of vertically spaced, continuously running belts disposed in a path. During the passage through a steam-heating zone, saturated steam with a saturation vapor pressure of 0.01 to 0.25 MPa(G) is fed to the mold space so that the expanded beads foamed and fuse bonded together. The resulting molded article is cooled during its passage through a cooling zone, discharged from the path and successively cut into a desired length (see, for example, Japanese Kokai Publications No. JP-A-H09-104026, No. JP-A-H09-104027 and No. JP-A-H10-180888).

Prior to the above in-mold molding, the expanded beads obtained by the above-described method may be charged in a pressure resisting vessel and treated with a pressurized gas such as air to increase the pressure inside the cells thereof to 0.01 to 0.15 MPa(G). The treated beads are taken out of the vessel and then subjected to in-mold molding. The treated expanded beads exhibit further improved in-mold moldability.

Example I

The expanded beads of the present invention will be described in more detail below by way of examples. These examples are not restrictive of the present invention, however.

Examples 1 to 3, 5, 7 to 11 and Comparative Examples 1 to 3

An extrusion device was used which had an extruder (inside diameter: 65 mm) for forming a core layer, an extruder (inside diameter: 30 mm) for forming an outer layer and a coextrusion die attached to exits of the two extruders for forming multi-layered strands. The PLA resins shown in Tables 1-1, 1-2 and 2 for forming a core layer and an outer layer were fed to respective extruders and melted and kneaded. The molten kneaded masses were introduced into the coextrusion die and combined in the die and coextruded in the form of multi-layer strands through small holes of a mouthpiece of the coextrusion die attached to a tip of the extrusion device. Each of the strands had a core layer and an outer layer covering the core layer with a weight ratio shown in Tables 1-1, 1-2 and 2. The coextruded strands were cooled with water and then cut with a pelletizer into particles each having a weight 2 mg. Drying of the cut particles gave multi-layered resin particles.

Meanwhile, the PLA resin of the core layer contained 1,000 ppm by weight of polytetrafluoroethylene powder (Trade name: TFW-1000, manufactured by Seishin Enterprise Co., Ld.) as a cell controlling agent and 1.5% by weight of a carbodiimide compound (bis(dipropylphenyl) carbodiimide, Stabaxol 1-LF produced by Rhein Chemie) as an end capping agent. The cell controlling agent and end capping agent were mixed into the PLA resin in the form of a master batch. The PLA resin of the outer layer contained 1.5% by weight of a carbodiimide compound (bis(dipropylphenyl)carbodiimide, Stabaxol 1-LF produced by Rhein Chemie) as an end capping agent. The end capping agent was mixed into the PLA resin in the form of a master batch.

In Example 8, only the extruder for forming a core layer was operated (the extruder for forming an outer layer was stopped) so that single layer resin particles were prepared.

Using the thus obtained resin particles, expanded beads were prepared. First, 50 kg of the obtained resin particles were charged in a 400 L pressure resisting vessel equipped with a stirrer together with 270 L of water as a dispersing medium, to which 300 g of aluminum oxide as a dispersing agent and 4 g (as effective amount) of a surfactant (sodium alkylbenzenesulfonate, Trade name: Neogen S-20F, manufactured by Dai-ichi Kogyou Seiyaku Co., Ltd.) were added. The contents were then heated with stirring to the foaming temperature (FT) shown in Tables 1-1, 1-2 and 2. Carbon dioxide ($CO_2$) as a blowing agent was then injected into the pressure resisting vessel until the pressure within the pressure resisting vessel reached the value shown in Tables 1-1, 1-2 and 2. After having been allowed to stand at that temperature for 15 minutes, the contents were released from the pressure resisting vessel (inside of which was maintained at the foaming temperature and the pressure shown in Tables 1-1, 1-2 and 2) to the atmospheric having an ambient temperature and an ambient pressure while applying a back pressure with carbon dioxide to maintain the pressure within the vessel at constant, whereby expanded beads having an apparent density as shown in Tables 1-1, 1-2 and 2 were obtained. The expanded beads obtained in Examples 1 to 3, 5, 8, 9 and 11 and Comparative Examples 1 to 3 each had a crystal structure that gave an intrinsic peak and a high temperature peak in the first time DSC curves (I) thereof. The expanded beads obtained in Example 7 had a crystal structure that gave only an intrinsic peak in the first time DSC curves (I) thereof.

Various physical properties of the thus obtained expanded beads such as endothermic calorific value of the high temperature peak, apparent density, closed cell content, average cell diameter and presence or absence of shrinkage thereof (determined with naked eyes), were measured and evaluated and the results are shown in Tables 1-1, 1-2 and 2.

Example 4

Using the resin particles obtained in Example 1, expanded beads were produced as follows. The resin particles (1 kg) obtained in the manner as described above were charged in a 5 L pressure resisting vessel together with 3 L of water as a dispersing medium, to which 3 g of aluminum oxide as a dispersing agent and 0.1 g (as effective amount) of a surfactant (sodium alkylbenzenesulfonate, Trade name: Neogen S-20F, manufactured by Dai-ichi Kogyou Seiyaku Co., Ltd.) were added. Then, 75 g of isobutane (iBut) as a blowing agent were added to the pressure resisting vessel with stirring. The contents in the vessel were then heated to the foaming temperature shown in Table 1-1 and maintained at that temperature for 15 minutes. Thereafter, the contents were released from the pressure resisting vessel (inside of which was maintained at the foaming temperature and the pressure shown in Table 1-1) to the atmospheric having an ambient temperature and an ambient pressure while applying a back pressure with nitrogen gas to maintain the pressure within the vessel at constant, whereby expanded beads having an apparent density as shown in Table 1-1 were obtained. The expanded beads obtained in Example 4 had a crystal structure that gave an intrinsic peak and a high temperature peak in the first time DSC curves (I) thereof.

Various physical properties of the thus obtained expanded beads such as endothermic calorific value of the high temperature peak, apparent density, closed cell content, average cell diameter and presence or absence of shrinkage thereof (determined with naked eyes), were measured and evaluated and the results are shown in Table 1-1.

Example 6

Expanded beads were prepared in the same manner as that of Example 1 except for incorporation of polytetrafluoroethylene powder (Trade name: TFW-1000, manufactured by Seishin Enterprise Co., Ld.) into the PLA resin of the core layer in an amount of 3,000 weight ppm. The expanded beads obtained in Example 6 had a crystal structure that gave an intrinsic peak and a high temperature peak in the first time DSC curves (I) thereof.

Comparative Examples 4 and 5

Using the resin particles obtained in Comparative Example 1, expanded beads were produced as follows. The resin particles (1 kg) obtained were charged in a 5 L pressure resisting vessel equipped with a stirrer together with 3 L of water as a dispersing medium, to which 3 g of aluminum oxide as a dispersing agent and 0.1 g (as effective amount) of a surfactant (sodium alkylbenzenesulfonate, Trade name: Neogen S-20F, manufactured by Dai-ichi Kogyou Seiyaku Co., Ltd.) were added. The contents were then heated with stirring to the foaming temperature shown in Table 2. Carbon dioxide as a blowing agent was then injected into the pressure resisting vessel until the pressure within the pressure resisting vessel reached the value shown in Table 2. After having been allowed to stand at that temperature for 15 minutes, the contents were released from the pressure resisting vessel (inside of which was maintained at the foaming temperature and the pressure shown in Table 2) to the atmospheric having an ambient temperature and an ambient pressure while applying a back pressure with nitrogen to maintain the pressure within the vessel at constant, whereby expanded beads having an apparent density as shown in Table 2 were obtained. The expanded beads obtained in Comparative Example 4 had a crystal structure that gave only an intrinsic peak in the first time DSC curve (I) thereof. The expanded beads obtained in Comparative Example 5 had a crystal structure that gave an intrinsic peak and a high temperature peak in the first time DSC curve (I) thereof.

Various physical properties of the thus obtained expanded beads such as endothermic calorific value of the high temperature peak, apparent density, closed cell content, average cell diameter and presence or absence of shrinkage thereof (determined with naked eyes), were measured and evaluated and the results are shown in Table 2.

TABLE 1-1

| | Example | | 1 | 2 | 3 | 4 | 5 | 6 |
|---|---|---|---|---|---|---|---|---|
| Resin Particles | Core layer | Resin Composition | *1) | *1) | *1) | *1) | *5) | *5) |
| | | Melting point (° C.) | 155 | 155 | 155 | 155 | 158 | 158 |
| | Outer layer | Resin Composition | *3) | *3) | *3) | *3) | *3) | *3) |
| | | Melting point (° C.) | none | none | none | none | none | none |
| | Core layer/Outer layer (weight ratio) | | 95/5 | 95/5 | 95/5 | 95/5 | 95/5 | 95/5 |
| | MFR (g/10 min); 190° C., 2.16 kgf | | 3.5 | 3.5 | 3.5 | 3.5 | 3.4 | 3.5 |
| | Glass transition temperature Tg (° C.) | | 56 | 56 | 56 | 56 | 56 | 56 |
| | Melting point (° C.) | | 155 | 155 | 155 | 155 | 157 | 157 |
| | Melt tension MT (mN); 190° C. *0 | | 19 | 19 | 19 | 19 | 18 | 19 |
| | Melt viscosity $\eta$(Pa·s); 190° C., 20 sec$^{-1}$ *0 | | 2,830 | 2,830 | 2,830 | 2,830 | 2,890 | 2,790 |
| | 0.93log$\eta$ − logMT *0 | | 1.93 | 1.93 | 1.93 | 1.93 | 1.95 | 1.93 |
| | Half crystallizataion time $CT_{1/2}$(sec) *0 | | 1.720 | 1,720 | 1,720 | 1,720 | 1,350 | 760 |
| Expanded Beads | Blowing agent | | $CO_2$ | $CO_2$ | $CO_2$ | iBut | $CO_2$ | $CO_2$ |
| | Autoclave inside pressure (MPa(G)) | | 2.2 | 2.2 | 2.5 | 2.9 | 2.2 | 2.2 |
| | Foaming temperature FT (° C.) | | 137.5 | 138 | 136.5 | 135 | 139 | 139.5 |
| | FT − Tg (° C.) | | 82 | 82 | 81 | 79 | 83 | 84 |
| | Apparent density (g/L) | | 119 | 119 | 119 | 119 | 119 | 119 |
| | High temperature peak calorific value (J/g) | | 3.1 | 1.4 | 7.4 | 3.2 | 3.7 | 2.7 |
| | Br:endo (J/g) | | 32 | 32 | 30 | 32 | 34 | 34 |
| | Brc:endo (J/g) | | 33 | 32 | 31 | 32 | 34 | 35 |
| | Brs:endo (J/g) | | 26 | 25 | 26 | 24 | 26 | 25 |
| | Bfc:exo (J/g) | | 16 | 16 | 16 | 14 | 14 | 9 |
| | Bfc:endo (J/g) | | 30 | 29 | 32 | 28 | 34 | 35 |
| | Bfc:endo − Bfc:exo (J/g) | | 14 | 13 | 16 | 14 | 20 | 26 |
| | Shrinkage of expanded beads | | none | none | none | none | none | none |
| | Closed cell content (%) | | 95 | 95 | 95 | 95 | 96 | 95 |
| | Average cell diameter (μm) | | 117 | 143 | 124 | 85 | 121 | 80 |

TABLE 1-2

| | | | Example | 7 | 8 | 9 | 10 | 11 |
|---|---|---|---|---|---|---|---|---|
| Resin Particles | Core layer | Resin Composition | | *1) | *1) | *1) | *1) | *1) |
| | | Melting point (° C.) | | 155 | 155 | 155 | 155 | 155 |
| | Outer layer | Resin Composition | | *3) | — | *3) | *3) | *3) |
| | | Melting point (° C.) | | none | — | none | none | none |
| | Core layer/Outer layer (weight ratio) | | | 95/5 | — | 95/5 | 95/5 | 95/5 |
| | MFR (g/10 min); 190° C., 2.16 kgf | | | 3.5 | 3.3 | 3.5 | 3.5 | 3.5 |
| | Glass transition temperatureTg (° C.) | | | 56 | 56 | 56 | 56 | 56 |
| | Melting point (° C.) | | | 155 | 155 | 155 | 155 | 155 |
| | Melt tension MT (mN); 190° C. *0 | | | 19 | 19 | 19 | 19 | 19 |
| | Melt viscosity η(Pa · s); 190° C., 20 sec$^{-1}$ *0 | | | 2,830 | 2,790 | 2,830 | 2,830 | 2,830 |
| | 0.93logη – logMT *0 | | | 1.93 | 1.93 | 1.93 | 1.93 | 1.93 |
| | Half crystallizataion time $CT_{1/2}$(sec) *0 | | | 1,720 | 1,680 | 1,720 | 1,720 | 1,720 |
| Expanded Beads | Blowing agent | | | $CO_2$ | $CO_2$ | $CO_2$ | $CO_2$ | $CO_2$ |
| | Autoclave inside pressure (MPa(G)) | | | 2.2 | 2.4 | 3.5 | 4 | 4 |
| | Foaming temperature FT (° C.) | | | 139 | 137.5 | 134.5 | 133.5 | 133 |
| | FT − Tg (° C.) | | | 83 | 82 | 79 | 78 | 77 |
| | Apparent density(g/L) | | | 119 | 119 | 61 | 49 | 49 |
| | High temperature peak calorific value (J/g) | | | 0.0 | 2.2 | 2.5 | 0.0 | 0.4 |
| | Br:endo (J/g) | | | 32 | 32 | 32 | 33 | 32 |
| | Brc:endo (J/g) | | | 31 | 32 | 32 | 33 | 33 |
| | Brs:endo (J/g) | | | 26 | 32 | 25 | 26 | 26 |
| | Bfc:exo (J/g) | | | 19 | 22 | 14 | 16 | 12 |
| | Bfc:endo (J/g) | | | 27 | 31 | 28 | 27 | 30 |
| | Bfc:endo − Bfc:exo (J/g) | | | 8 | 9 | 14 | 11 | 18 |
| | Shrinkage of expanded beads | | | none | none | none | slightly | slightly |
| | Closed cell content (%) | | | 96 | 96 | 95 | 94 | 94 |
| | Average cell diameter (μm) | | | 143 | 103 | 98 | 124 | 80 |

In the Tables 1-1 and 1-2, *0, *1, *3 and *5 are as follows:
*0: Values measured on a cut out core layer of the multi-layered resin particle;
*1: Crystalline PLA; produced by Nature Works LLC (D-isomer content: 4.4%, melting point: 155° C., MFR (190° C./2.16 kgf): 2.9 g/10 min;
*3: Non-crystalline PLA; produced by Nature Works LLC (D-isomer content: 11.8%, melting point: not confirmed, MFR (190° C./2.16 kgf): 4.4 g/10 min;
*5: Crystalline PLA; produced by Nature Works LLC (D-isomer content: 4.1%, melting point: 158° C., MFR (190° C./2.16 kgf): 3.1 g/10 min;

TABLE 2

| | | | Comparative Example | 1 | 2 | 3 | 4 | 5 |
|---|---|---|---|---|---|---|---|---|
| Resin Particles | Core layer | Resin Composition | | *2) | *4) | *2)/*3) = 6/4 (weight ratio) | *2) | *2) |
| | | Melting point (° C.) | | 168 | 168 | 167 | 168 | 168 |
| | Outer layer | Resin Composition | | *3) | *3) | *3) | *3) | *3) |
| | | Melting point (° C.) | | none | none | none | none | none |
| | Core layer/Outer layer (weight ratio) | | | 95/5 | 95/5 | 95/5 | 95/5 | 95/5 |
| | MFR (g/10 min); 190° C., 2.16 kgf | | | 3.7 | 11.4 | 4.5 | 3.7 | 3.7 |
| | Glass transition temperatureTg (° C.) | | | 56 | 57 | 56 | 56 | 56 |
| | Melting point (° C.) | | | 169 | 168 | 166 | 169 | 169 |
| | Melt tension MT(mN); 190° C. *0 | | | 18 | unable to measure | 15 | 18 | 18 |
| | Melt viscosity η(Pa · s); 190° C., 20 sec$^{-1}$ *0 | | | 2,920 | 990 | 2,300 | 2,920 | 2,920 |
| | 0.93logη − logMT *0 | | | 1.97 | — | 1.95 | 1.97 | 1.97 |
| | Half crystallizataion time $CT_{1/2}$(sec) *0 | | | 350 | 310 | 470 | 350 | 350 |
| Expanded Beads | Blowing agent | | | $CO_2$ | $CO_2$ | $CO_2$ | $CO_2$ | $CO_2$ |
| | Autoclave inside pressure (MPa(G)) | | | 2.0 | 2.2 | 2.5 | 4.0 | 4.5 |
| | Foaming temperature FT (° C.) | | | 147.5 | 148.5 | 146.5 | 143.5 | 141.5 |
| | FT − Tg (° C.) | | | 92 | 92 | 91 | 88 | 86 |
| | Apparent density (g/L) | | | 119 | 119 | 119 | 61 | 49 |
| | High temperature peak calorific value (J/g) | | | 3.0 | 2.6 | 3.3 | 0.0 | 0.7 |
| | Br:endo (J/g) | | | 42 | 43 | 26 | 42 | 41 |
| | Brc:endo (J/g) | | | 42 | 44 | 26 | 42 | 42 |
| | Brs:endo (J/g) | | | 33 | 33 | 21 | 32 | 32 |
| | Bfc:exo (J/g) | | | 14 | 11 | 9 | 13 | 15 |
| | Bfc:endo (J/g) | | | 39 | 42 | 24 | 38 | 39 |
| | Bfc:endo − Bfc:exo (J/g) | | | 25 | 31 | 15 | 25 | 24 |
| | Shrinkage of expanded beads | | | present | present | present | present | present |
| | Closed cell content (%) | | | 92 | 92 | 90 | 88 | 88 |
| | Average cell diameter (μm) | | | 149 | 170 | 161 | 110 | 102 |

In the Table 2, *0, *2, *3 and *4 are as follows:
*0: Values measured on a cut out core layer of the multi-layered resin particle;
*2: Crystalline PLA; produced by Nature Works LLC (D-isomer content: 1.5%, melting point: 168° C., MFR (190° C./2.16 kgf): 3.1 g/10 min;
*3: Non-crystalline PLA; produced by Nature Works LLC (D-isomer content: 11.8%, melting point: not confirmed, MFR (190° C./2.16 kgf): 4.4 g/10 min;
*4: Crystalline PLA; produced by Nature Works LLC (D-isomer content: 1.4%, melting point: 168° C., MFR (190° C./2.16 kgf): 11.6 g/10 min;

Next, molded articles were prepared using the expanded beads obtained in the foregoing Examples and Comparative Examples. The expanded beads obtained in each of the above Examples and Comparative Examples were first subjected to a pressurizing treatment to impart the internal pressure shown in Tables 3 and 4. The expanded beads having the increased internal pressure were placed in a cavity of the flat plank mold having a length of 200 mm, a width of 250 mm and a thickness of 50 mm and subjected to an in-mold molding process by steam heating to obtain molded articles each in the form of a plank. The heating with steam was performed as follows. Steam was fed for 5 seconds for preheating in such a state that drain valves of the stationary and moveable molds were maintained in an open state (purging step). Next, while maintaining only the drain valve on the stationary mold in an open state, steam was fed from the moveable mold for 3 seconds. Then, while maintaining only the drain valve on the moveable mold in an open state, steam was fed from the stationary mold for 3 seconds. Thereafter, heating was carried out with the heating steam pressure (molding vapor pressure) shown in Tables 3 and 4.

After completion of the heating, cooling with water was carried out until a surface pressure attributed to the expanding force of the molded article was reduced to 0.01 MPa(G). The molds were then opened and the molded body was taken out therefrom. The molded body was aged in an oven at 40° C. for 15 hours, then aged in an oven at 70° C. for another 15 hours, and thereafter allowed to gradually cool to room temperature to obtain a molded article.

Each of the thus prepared molded articles were evaluated for their various physical properties such as appearance, bending modulus, 50% compression stress, degree of fusion bonding and shrinkage. The results are summarized in Tables 3 and 4.

TABLE 3

| | | Example | 1 | 2 | 3 | 4 | 5 | 6 | 7 | 8 | 9 | 10 | 11 |
|---|---|---|---|---|---|---|---|---|---|---|---|---|---|
| Expanded Beads Molded Article | Molding Conditions | Bead internal pressure (MPa(G)) | 0.05 | 0.05 | 0.10 | 0.05 | 0.05 | 0.05 | 0.05 | 0.05 | 0.06 | 0.06 | 0.06 |
| | | Vapor pressure (MPa(G)) | 0.08 | 0.04 | 0.16 | 0.10 | 0.12 | 0.08 | 0.06 | 0.16 | 0.08 | 0.08 | 0.08 |
| | Physical Properties | Density of molded article (g/L) | 84 | 84 | 84 | 84 | 84 | 84 | 84 | 84 | 42 | 33 | 33 |
| | | Shrinkage (%) | 1.7 | 1.6 | 1.7 | 1.6 | 1.6 | 1.7 | 1.6 | 1.7 | 1.6 | 1.6 | 1.6 |
| | | Fusion bonding degree (%) | 90 | 90 | 80 | 80 | 90 | 90 | 70 | 50 | 100 | 100 | 100 |
| | | 50% compressive stress (MPa) | 0.87 | 0.81 | 1.00 | 0.88 | 0.92 | 0.90 | 0.81 | 0.85 | 0.46 | 0.31 | 0.34 |
| | | Bending modulus (MPa) | 30 | 21 | 31 | 29 | 29 | 29 | 18 | 29 | 17 | 10 | 10 |
| | | Bending modulus/ Density of molded article (MPa · L/g) | 0.35 | 0.25 | 0.37 | 0.35 | 0.35 | 0.34 | 0.22 | 0.34 | 0.40 | 0.30 | 0.30 |
| | | Heat resistance; dimension change upon heating [120° C.](%) | −0.5 | −0.5 | −0.3 | −0.6 | −0.4 | −0.5 | −0.3 | −0.3 | −1.2 | −1.8 | −1.8 |
| | | Appearance | good | good | fair | good | good | good | good | good | good | good | good |

TABLE 4

| | | Comparative Example | 1 | 2 | 3 | 4 | 5 |
|---|---|---|---|---|---|---|---|
| Expanded Beads Molded Article | Molding Conditions | Bead internal pressure (MPa(G)) | 0.05 | 0.05 | 0.05 | 0.06 | 0.06 |
| | | Vapor pressure (MPa(G)) | 0.08 | 0.08 | 0.08 | 0.08 | 0.08 |
| | Physical Properties | Density of molded article (g/L) | 84 | 84 | 84 | 42 | 33 |
| | | Shrinkage (%) | 1.4 | 1.4 | 2.0 | 1.4 | 1.6 |
| | | Fusion bonding degree (%) | 90 | 80 | 80 | 90 | 80 |
| | | 50% compressive stress (MPa) | 0.80 | 0.73 | 0.77 | 0.38 | 0.33 |
| | | Bending modulus (MPa) | 15 | 13 | 14 | 7 | 6 |
| | | Bending modulus/ Density of molded article (MPa · L/g) | 0.18 | 0.16 | 0.17 | 0.16 | 0.19 |

TABLE 4-continued

| Comparative Example | 1 | 2 | 3 | 4 | 5 |
|---|---|---|---|---|---|
| Heat resistance; dimension change upon heating [120° C.](%) | −0.3 | −0.4 | −2.3 | −1.0 | −1.6 |
| Appearance | good | good | fair | good | good |

Methods for evaluating physical properties of the expanded beads and foamed molded articles are as follows.

Appearance:

Appearance was evaluated by observation of a surface of a molded article with naked eyes and rated as follows:
Good: Almost no spaces between beads are observed in the surface of the molded article and the surface state is good.
Fair: Spaces between beads are observed, although not significantly, in the surface of the molded article.
Poor: Spaces between beads are significantly observed in the surface of the molded article.

Degree of Fusion Bonding:

A degree of fusion bonding is evaluated in terms of a proportion (percentage) of the number of expanded beads that underwent material failure based on the number of expanded beads that were exposed on a ruptured cross section obtained by rupturing a molded article. More specifically, a test piece was cut out from each of the molded articles. A cut with a depth of about 5 mm was then formed on each test piece with a cutter knife. Each test piece was then ruptured along the cut line. The ruptured cross section was observed to count a number (n) of the expanded beads present on the cross section and a number (b) of the expanded beads which underwent material failure. The ratio (b/n) in terms of percentage of (b) based on (n) represents the fusion bonding degree (%).

Density of Molded Article:

The density of the molded article was measured as follows. The molded article was allowed to stand at a temperature of 23° C. under a relative humidity of 50% for 24 hours and measured for its outer dimension to determine the bulk volume thereof. The molded article was then weighed precisely. The weight (g) of the molded article was divided by the bulk volume and the unit was converted to determine the bulk density (g/L) thereof.

50% Compression Stress:

A test piece (without skin) having a length of 50 mm, a width of 50 mm and a thickness of 25 mm was cut out from a molded article and was subjected to a compression test in which the test piece was compressed in the thickness direction at a compression rate of 10 mm/min according to JIS K6767 (1999) to determine 50% compression stress of the molded article.

Bending Modulus:

A test piece (without skin) having a length of 120 mm, a width of 25 mm and a thickness of 20 mm was cut out from a molded article and was subjected to a bending test in which the test piece was bent at a rate of 10 mm/min according to JIS K7221-1 (1999) to determine bending modulus of the molded article.

Dimension Change Upon Heating:

The molded articles were each evaluated for their heat resistance in terms of dimension change upon heating. In accordance with JIS K6767 (1999), "thermal stability (Dimensional Stability at High Temperatures", method B)", a test piece was heated for 22 hours in a gear oven maintained at 120° C. Thereafter, the test piece was taken out of the oven and allowed to stand for 1 hour in a constant temperature and humidity room maintained at 23° C. and 50% relative humidity. From the dimensions before and after the heating, a change in dimension upon heating is calculated according to the following formula:

Dimension change upon heating(%)=(([Dimension after heating]−[Dimension before heating])/[Dimension before heating])×100

From the comparison between Examples and Comparative Examples, it is seen that the expanded beads obtained in Examples are free of or almost free of shrinkage and that the molded articles obtained therefrom have excellent mechanical properties (bending modulus and compressive strength) and heat resistance.

The invention claimed is:

1. A process for producing polylactic acid-based resin expanded beads, comprising the steps of:
dispersing polylactic acid-based resin particles in an aqueous dispersing medium contained in a pressure resisting vessel in the presence of a physical blowing agent with heating under a pressure to obtain blowing agent-impregnated foamable resin particles, and
releasing the foamable resin particles, maintained at a temperature of 120 to 160° C., together with the dispersing medium from the pressure resisting vessel into an atmosphere having a lower pressure than that in the pressure resisting vessel to foam and expand the foamable resin particles,
wherein the polylactic acid-based resin satisfies the following conditions (1) to (3):

$$MT \leq 30 \text{ mN} \quad (1)$$

$$\log MT \leq 0.93 \log \eta - 1.75 \quad (2)$$

$$CT_{1/2} \leq 600 \text{ sec} \quad (3)$$

where MT represents a melt tension [mN] of the polylactic acid-based resin at 190° C., $\eta$ represents a melt viscosity [Pa·s] of the polylactic acid-based resin at 190° C. and a shear speed of 20 sec$^{-1}$, and $CT_{1/2}$ represents a half crystallization time [sec] of the polylactic acid-based resin at 110° C.

2. The process as recited in claim 1, wherein the polylactic acid-based expanded resin beads, when measured by the below-mentioned heat flux differential scanning calorimetry, give a first time DSC curve and a second time DSC curve,
wherein the second time DSC curve has a fusion peak having a reference peak top temperature,
wherein the first time DSC curve has both a fusion peak(s) with a peak top temperature that is on a high temperature side which is higher than the reference peak top temperature and a fusion peak(s) with a peak top temperature that is on a low temperature side which is not higher than the reference peak top temperature, and
wherein the first and second time DSC curves are measured and defined as follows:
(a) a DSC curve of a test sample of the expanded polylactic acid-based resin beads is measured according to a heat flux differential scanning calorimetry method referenced in JIS K7122 (1987), by heating the test sample at a heating rate of 10° C./minute from 23° C. to a temperature higher by 30° C. than the temperature at which the endothermic peak ends, thereby obtaining the first time DSC curve;

(b) the test sample is then maintained for 10 minutes at the temperature higher by 30° C. than the temperature at which the endothermic peak ends in the first time DSC curve;

(c) the test sample is then cooled to 30° C. at a cooling rate of 10° C./minute;

(d) the test sample is then measured again for another DSC curve by being heated at a heating rate of 10° C./minute to a temperature higher by 30° C. than the temperature at which the endothermic peak ends, thereby obtaining the second time DSC curve.

3. The process as recited in claim 2, wherein the fusion peak(s) with the peak top temperature that is on a higher temperature side which is higher than the reference peak top temperature has a calorific value of 1 to 8 J/g.

4. The process as recited in claim 1, wherein the polylactic acid-based resin expanded beads have an apparent density of 24 to 240 g/L.

5. A process for producing polylactic acid-based resin expanded beads, comprising the steps of:

dispersing polylactic acid-based resin particles in an aqueous dispersing medium contained in a pressure resisting vessel in the presence of a physical blowing agent with heating under a pressure to obtain softened, pressurized blowing agent-impregnated foamable resin particles, and releasing the softened, pressurized foamable resin particles, maintained at a temperature of 120 to 160° C. and a pressure of 1.0 to 5.0 MPa (G), together with the dispersing medium from the pressure resisting vessel into an atmosphere having a lower pressure than that in the pressure resisting vessel to foam and expand the foamable resin particles, wherein the polylactic acid-based resin satisfies the following conditions (1) to (3):

$$MT \leq 30 \text{ mN} \tag{1}$$

$$\log MT \leq 0.93 \log \eta - 1.75 \tag{2}$$

$$CT_{1/2} \leq 600 \text{ sec} \tag{3}$$

where MT represents a melt tension [mN] of the polylactic acid-based resin at 190° C., η represents a melt viscosity [Pa·s] of the polylactic acid-based resin at 190° C. and a shear speed of 20 sec$^{-1}$, and $CT_{1/2}$ represents a half crystallization time [sec] of the polylactic acid-based resin at 110° C.

6. The process as recited in claim 1, wherein the polylactic acid-based resin satisfies the following condition (1): 10 mN≤MT≤30 mN.

* * * * *